(12) United States Patent
Harpring et al.

(10) Patent No.: US 9,678,219 B2
(45) Date of Patent: Jun. 13, 2017

(54) POSITION AND ORIENTATION DETERMINATION SYSTEM AND METHOD

(71) Applicant: SAVANNAH RIVER NUCLEAR SOLUTIONS, LLC, Aiken, SC (US)

(72) Inventors: Lawrence J. Harpring, North Augusta, SC (US); Eduardo B. Farfan, Aiken, SC (US); John R. Gordon, Aiken, SC (US); Gerald T. Jannik, North Augusta, SC (US); Trevor Q. Foley, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 0 days.

(21) Appl. No.: 14/823,196

(22) Filed: Aug. 11, 2015

(65) Prior Publication Data

US 2015/0346355 A1    Dec. 3, 2015

Related U.S. Application Data

(62) Division of application No. 13/212,483, filed on Sep. 21, 2011, now Pat. No. 9,147,503.

(60) Provisional application No. 61/403,813, filed on Sep. 22, 2010, provisional application No. 61/401,718, filed on Aug. 18, 2010.

(51) Int. Cl.
| | | |
|---|---|---|
| *G01T 1/00* | (2006.01) | |
| *G01T 1/169* | (2006.01) | |
| *G01T 1/167* | (2006.01) | |
| *G01T 7/00* | (2006.01) | |
| *G21K 1/02* | (2006.01) | |

(52) U.S. Cl.
CPC .............. *G01T 1/169* (2013.01); *G01T 1/167* (2013.01); *G01T 7/00* (2013.01); *G21K 1/025* (2013.01)

(58) Field of Classification Search
CPC ......... G01T 1/2978; G01T 3/00; G01T 1/169; G01T 1/167; G01T 7/00; G21K 1/025
USPC .......................................................... 250/394
See application file for complete search history.

(56) References Cited

U.S. PATENT DOCUMENTS

| | | | | |
|---|---|---|---|---|
| 4,797,701 A | * | 1/1989 | Lannes | G01T 1/1644 250/475.2 |
| 5,286,973 A | * | 2/1994 | Westrom | G01T 7/00 250/253 |
| 5,473,368 A | * | 12/1995 | Hart | G08B 13/1963 348/155 |
| 5,947,225 A | * | 9/1999 | Kawakami | G05D 1/0219 180/167 |
| 5,956,661 A | * | 9/1999 | Lefebvre | G01C 15/002 356/613 |

(Continued)

*Primary Examiner* — David J Makiya
*Assistant Examiner* — Taeho Jo
(74) *Attorney, Agent, or Firm* — Dority & Manning, P.A.

(57) ABSTRACT

A position determination system and method is provided that may be used for obtaining position and orientation information of a detector in a contaminated room. The system includes a detector, a sensor operably coupled to the detector, and a motor coupled to the sensor to move the sensor around the detector. A CPU controls the operation of the motor to move the sensor around the detector and determines distance and angle data from the sensor to an object. The method includes moving a sensor around the detector and measuring distance and angle data from the sensor to an object at incremental positions around the detector.

13 Claims, 15 Drawing Sheets

(56) References Cited

U.S. PATENT DOCUMENTS

| | | | | |
|---|---|---|---|---|
| 5,995,765 A * | 11/1999 | Kaneko | G01C 15/008 | 348/144 |
| 6,504,610 B1 * | 1/2003 | Bauer | G01B 11/272 | 356/399 |
| 6,815,687 B1 * | 11/2004 | Branch-Sullivan | H01L 27/14658 | 250/330 |
| 8,000,436 B2 * | 8/2011 | Seppi | G01N 23/046 | 378/19 |
| 2005/0105076 A1 * | 5/2005 | Jung | G01C 3/32 | 356/4.01 |
| 2006/0020369 A1 * | 1/2006 | Taylor | A47L 9/009 | 700/245 |
| 2006/0073005 A1 * | 4/2006 | Jonas | F16M 11/10 | 414/784 |
| 2006/0256229 A1 * | 11/2006 | Wernersson | H04N 5/23212 | 348/348 |
| 2007/0156286 A1 * | 7/2007 | Yamauchi | G05D 1/0038 | 700/245 |
| 2007/0179670 A1 * | 8/2007 | Chiappetta | G05D 1/0272 | 700/245 |
| 2008/0009966 A1 * | 1/2008 | Bruemmer | G06N 3/008 | 700/245 |
| 2008/0114560 A1 * | 5/2008 | Jonas | F16M 11/123 | 702/94 |
| 2009/0109420 A1 * | 4/2009 | Kludas | G01C 15/002 | 356/3.01 |
| 2009/0138233 A1 * | 5/2009 | Kludas | G01C 15/00 | 702/158 |
| 2009/0157228 A1 * | 6/2009 | Hong | B25J 9/1689 | 700/259 |
| 2010/0030380 A1 * | 2/2010 | Shah | G01S 7/4813 | 700/258 |
| 2010/0045777 A1 * | 2/2010 | Mellor | G01T 7/00 | 348/42 |
| 2010/0091094 A1 * | 4/2010 | Sekowski | B66F 9/0755 | 348/50 |
| 2010/0194641 A1 * | 8/2010 | Miller | G01S 5/04 | 342/417 |
| 2010/0222954 A1 * | 9/2010 | Ichinose | G05D 1/024 | 701/26 |
| 2010/0296075 A1 * | 11/2010 | Hinderling | G01C 3/08 | 356/3 |
| 2011/0042459 A1 * | 2/2011 | Sullivan | F41A 27/14 | 235/407 |
| 2011/0054689 A1 * | 3/2011 | Nielsen | G05D 1/0088 | 700/258 |
| 2012/0008136 A1 * | 1/2012 | Jaeger | G01C 1/02 | 356/138 |

* cited by examiner

POSITION AND ORIENTATION DETERMINATION SYSTEM AND METHOD

CROSS REFERENCE TO RELATED APPLICATION

The present application is a divisional of U.S. application Ser. No. 13/212,483, filed on Sep. 21, 2011, entitled "System and Method for the Identification of Radiation in Contaminated Rooms," which claims priority to U.S. Provisional Application 61/401,718 filed on Aug. 18, 2010, entitled "Position and Orientation Determination System for a Radiation Detector" and U.S. Provisional Application 61/403,813 filed on Sep. 22, 2010, entitled "Hot Cell/Glovebox Characterization Using PODS™, RDDS™, BRACE™, and SourceMarker™," the disclosures of which are incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

The present invention relates generally to the characterization of areas such as shielded cells (hot cells), glove boxes, and rooms contaminated by radioactive materials involving gamma-ray, alpha-particle and neutron emitters. More particularly, the present application involves a directional shield, a position determination system, a back-projected radiation analyzer and cell evaluator method, and a system for visually highlighting contaminated areas on objects such as walls of a contaminated room.

BACKGROUND

The use of radioactive material may result in the contamination of reactors, fuel and isotope processing facilities, laboratories, glove boxes, isolators, and other rooms. Decontamination efforts of these rooms benefit from knowledge of where in the room radioactive contamination is located. A worker may concentrate his or her decontamination efforts on portions of the room that are actually contaminated while avoiding those areas that are already clean thus saving time, effort, money and exposure to radiation. Identification of radioactive contamination in a room may be accomplished through the use of a collimator that includes a detector made of a radiosensitive detector material that is in the shape of a sphere. The detector is located within a collimator shield that has a series of through apertures. The collimator may be placed within a room that is contaminated with radioactive material for a time sufficient to allow portions of the detector to become opaque via exposure to the radiation contamination.

The apertures of the collimator shield function to direct or channel the radiation into the spherical detector so that opaque lines or streaks are formed. The degree of opaqueness and the direction of the lines yield information on the intensity of the radiation and its direction. The collimator shield functions to block out radiation either completely or partially so that portions of the detector are not turned opaque to better allow this determination.

The collimator is a passive device and thus cannot determine its position or orientation within the room. The user may remove the detector and examine same in order to determine radiation intensity and direction in much the same way that a medical professional will examine an X-ray. It may be the case that the sources of radiation that can be transferred through an aperture of the collimator shield are at too remote an angle to the aperture. Such radiation may cause opaque portions to be formed in association with the aperture that would be confusing or tend to be interpreted as noise thus hindering accurate identification of radiation intensity and location. Although techniques are available for ascertaining the location and intensity of radiation contamination within a room, such techniques are subjective in nature, costly, not efficient, limited in application, not automatic, and inaccurate. As such, there remains room for variation and improvement in the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended FIGS. in which.

Figure 1:
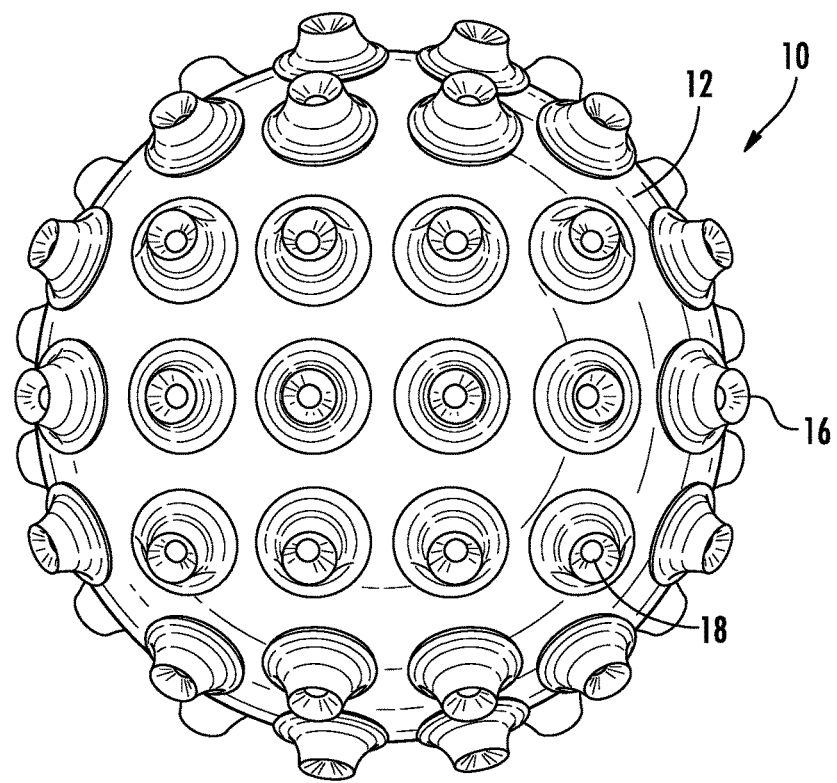
FIG. 1 is a top, plan view of a collimator in accordance with one exemplary embodiment.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

A collimator 10 can be used to measure intensity of radioactive material in a contaminated room. The collimator 10 may include a detector 14 that is made of a substance sensitive to radiation. Apertures 18 of the collimator 10 function to channel the direction of radiation exposure onto the detector 14 into lines so that one may more easily ascertain the location and intensity of present radiation.

FIG. 1 illustrates a collimator 10 that can be used in accordance with one exemplary embodiment of the invention. The collimator 10 may be spherical in shape and can have a collimator shield 12 made of a generally thick and dense shielding material. A plurality of apertures 18 extend through the collimator shield 12 and extend around the outer surface of the collimator 10. The apertures 18 may be positioned around the entire outer surface of the collimator 10, or may extend around only portions of the outer surface while certain sections, such as the bottom, are not provided with apertures 18. Radiation, such as high energy gamma rays, may extend through the apertures 18 and form streaks or otherwise discolored areas within a detector 14 located within the collimator shield 12 for identification. The collimator 10 may include a plurality of directional shields 16 located at the apertures 18 for use in demarcating a field of view 22 to reduce noise that may otherwise be present within the detector 14 due to air gaps formed via the presence of the apertures 18. The detector 14, along with other portions of the collimator 10, may be as described in World Intellectual Property Organization International Publication No. WO 2009/063246 A2, the entire contents of which are incorporated by reference herein in their entirety for all purposes.

Figure 2:
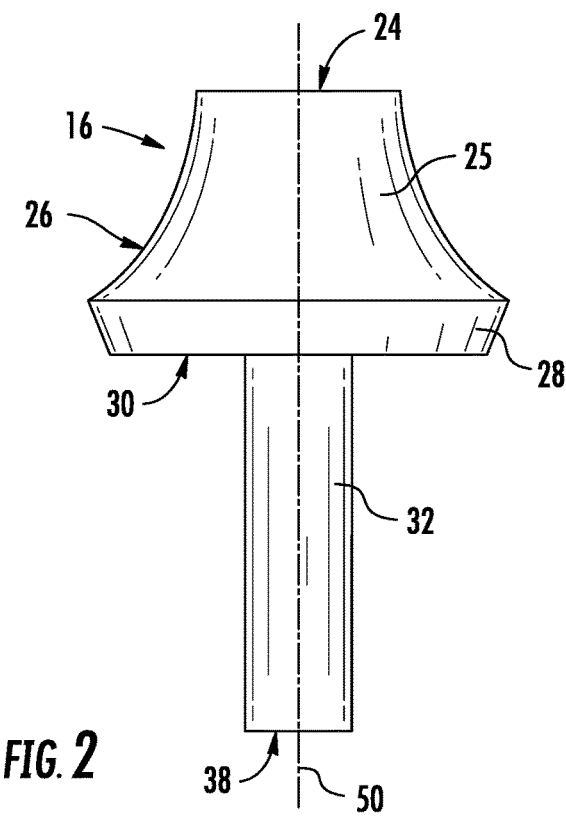
FIG. 2 is a side view of a directional shield in accordance with one exemplary embodiment.

An exemplary embodiment of a directional shield 16 is illustrated with reference to FIGS. 2, 4 and 5. The directional shield 16 may be made out of the same material as the material making up the collimator shield 12. The directional shield 16 may thus resist the transfer of certain types of radiation therethrough to the same extent as a comparable portion of the collimator shield 12. However, it is to be understood that in other arrangements that the directional shield 16 may be made of material that is more or less impervious to the transmission of various types of radiation therethrough. The directional shield 16 may include a base 28 that has an outer surface that is generally in the shape of a truncated cone having its larger portion above its smaller portion. The base 28 may be symmetrical about its axis which is also the axis 50 of the directional shield 16. Although described as being in the shape of a truncated cone, the bottom surface of the base 28 may be concave instead of flat. As shown more clearly with reference to FIGS. 3 and 5, a concave lower surface 30 of the base 28 is present and is symmetrical about axis 50. The concave lower surface 30 may be present in order to be complimentary to a curved outer surface of the collimator shield 12. In this regard, the concave lower surface 30 may match the curvature of the convex upper surface of the collimator shield 12 so that these two surfaces fit against one another with no air gap therebetween. However, in other arrangements, the concave lower surface 30 need not be present and the lower surface of the base 28 may be convex in shape or can be flat in shape.

An upper portion of the directional shield 16 may extend upwards from the base 28 and may have a concave outer surface 26 that is symmetrical and extends completely 360° about the axis 50. The concave outer surface 26 has a shape that resembles a truncated cone, except for the fact that its outer surface is concave. Upon extending away from the base 28, the radial size of the concave outer surface 26 and hence the upper portion 25 decreases in size. The upper portion 25 demarcates the upper terminal end of the directional shield 16 at a top 24.

A stem 32 extends downwards from the base 28 and is cylindrical in shape. A bottom terminal end of the stem 32 opposite from the base 28 defines the bottom 38 of the directional shield 16. The outer surface of the stem 32 is uniform and symmetrical in shape about axis 50. The longitudinal length of the stem 32 may be longer than the longitudinal lengths of the upper portion 25 and base 28 combined. The various portions of the direction shield 16 such as the upper portion 25, base 28, and stem 32 may be integrally formed with one another and hence a single piece, or may be multiple pieces connected to one another. Further, the upper portion 25, base 28, and stem 32 may all be made of the same material, or may be made of different material from one another in accordance with various exemplary embodiments. Further, although disclosed as having an upper portion 25, base 28, and stem 32, it is to be understood that additional components may be present in other embodiments. Likewise, other versions of the directional shield 16 exist in which one or more of the upper portion 25, base 28, and stem 32 are not present.

Figure 3:
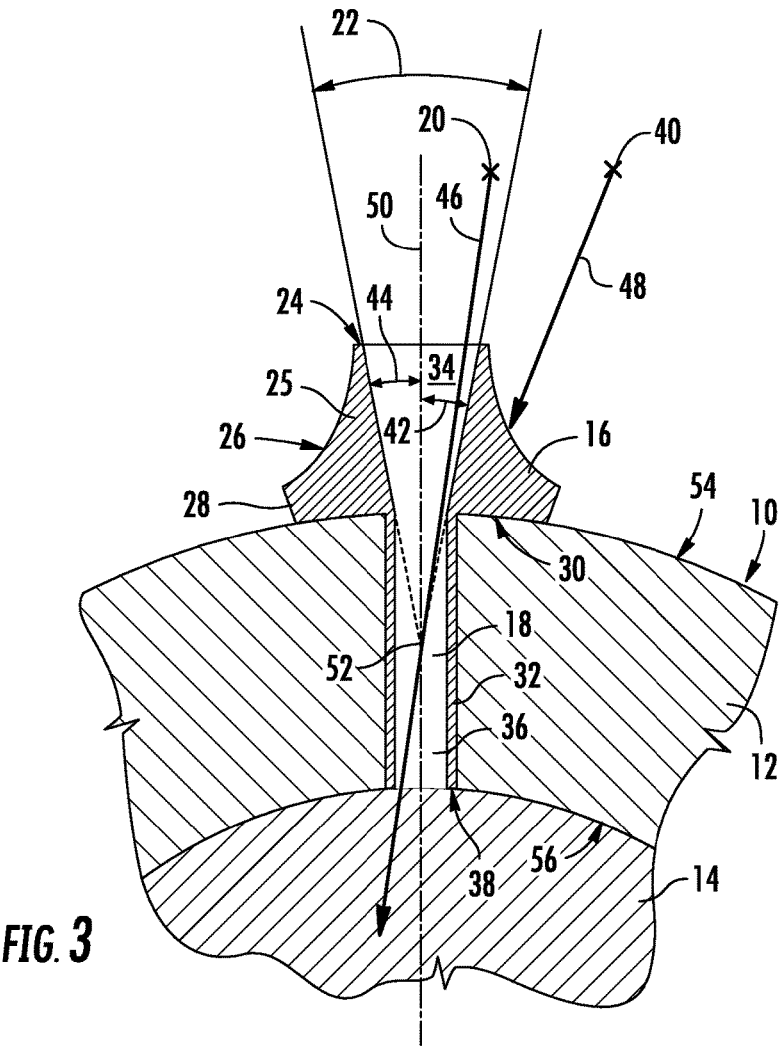
FIG. 3 is a cross-sectional view of a portion of the collimator of FIG. 1.
Figure 4:
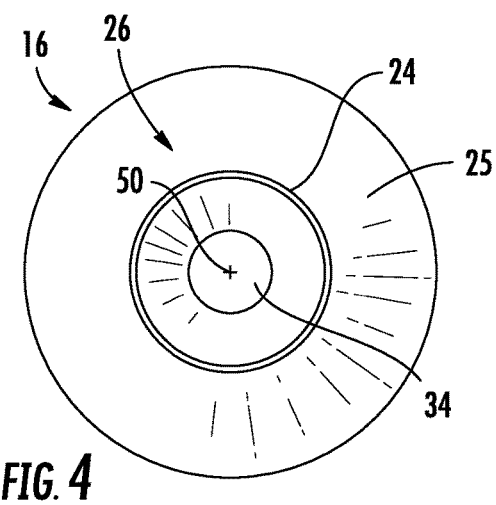
FIG. 4 is a top view of FIG. 2.
Figure 5:
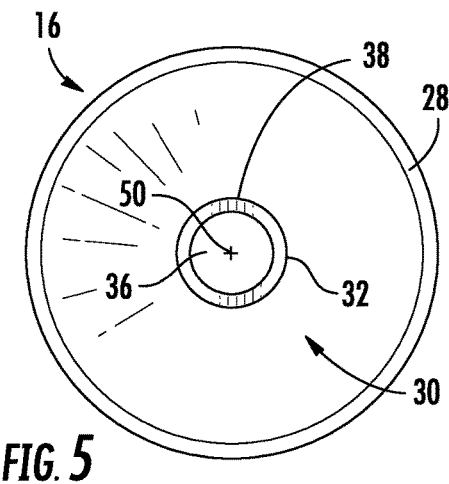
FIG. 5 is a bottom view of FIG. 2.

With reference to FIGS. 3-5, it can be seen that the directional shield 16 is hollow. An aperture extends all the way through the directional shield 16 from the top 24 to the bottom 38. The aperture is made of two connected apertures 34 and 36. Aperture 34 is in the shape of a truncated cone with its larger portion located above its smaller portion.

Aperture 34 extends from the top 24 through the upper portion 25 and also through base 28. Aperture 34 is symmetric about axis 50. The angle on the sides of aperture 34 is constant all the way through upper portion 25 and base 28.

Aperture 34 may terminate at the bottom of base 28 and may be in communication with aperture 36. Aperture 36 is cylindrical in shape and extends from the top of the stem 32 adjacent base 28 to the bottom 38 of the directional shield 16. Aperture 36 may have a diameter that is the same as the smallest diameter of the aperture 34 which is the diameter at the bottom of aperture 34. Aperture 36 is symmetrical in shape such that the sides of aperture 36 are located the same distance from the axis 50 along their entire lengths from the top of stem 32 adjacent base 28 to the bottom 38. As shown with reference to FIG. 3, if the sides of aperture 34 were continued downward, they would intersect at a location within aperture 36. This location may be one half of the way along the longitudinal distance of the stem 32 along axis 50.

The directional shield 16 functions to provide a field of view 22 to allow radiation, such as gamma radiation, within the field of view 22 to be imparted to the detector 14, while radiation, such as gamma radiation, outside of the field of view 22 is not imparted to the detector 14. As such gamma radiation through the aperture 18 may be regulated so that only gamma radiation within the field of view 22 is imparted through the aperture 18 and those outside the field of view are not imparted through aperture 18 into the detector 14. The directional shield 16 functions to increase the amount of attenuating material thickness based on the angle of incidence of the source of radiation. This configuration may afford a very abrupt transition point between in-field and out-of-field angles of incidence to allow for both detection of radiation and elimination of noise associated with radiation located at too remote an angle. As such, once the radiation source is beyond the field of view 22, instead of having a continuous reduction in readings, the detector 14 reading will remain essentially constant.

The collimator 10 is constructed so that there is an equal amount of attenuating material between the detector 14 and the source of radiation at angles beyond the field of view 22. In other arrangements, a greater amount may be present. The additional attenuating material provided to the detector 14 takes into account the "air gap" introduced by the aperture 18. The shape of the directional shield 16 is such that the total thickness of material through the center of the aperture 18 and at angles beyond the field of view 22 is equal to the thickness of attenuating material in a solid (no aperture 18) sphere of attenuating material at the same angle.

As shown in FIG. 3, a radiation source 20 is present that is situated at an angle within the field of view 22 of the directional shield 16. The aperture 34 is sized such that a first angle 42 extends from the axis 50 to one side wall of the upper portion 25 and base 28, and such that a second angle 44 extends from the axis 50 to an opposite side wall of the upper portion 25 and base 28 that is essentially in the opposite direction. If the side walls of the upper portion 25 and base 28 were extended, they would meet at a location in the stem 32 that would be the origin 52 of the two angles 42 and 44. Addition of the two angles 42 and 44 may yield the field of view 22 of the directional shield 16. The field of view 22 may be from 0°-45°, from 45°-90°, from 90°-120°, or up to 140° in accordance with various exemplary embodiments. Radiation source 20 projects a path 46 towards the directional shield 16 that is within the field of view 22 such that the angle of path 46 with respect to the axis 50 through the origin 52 is less than angle 42. Radiation source 20 will be "seen" by the detector 14 through the aperture 18 and be noted by the detector 14.

A second radiation source 40 may be present and can be at a greater angle of incidence than the first radiation source 20. Second radiation source 40 may generate a path 48 towards the detector 14. Second radiation source 40 may be at a location beyond the field of view 22 such that the angle of path 48 through the origin 52 with respect to the axis 50 is greater than that of angle 42. As shown, path 48 must go through some amount of the upper portion 25 and base 28 of the directional shield 16 before entering the aperture 18 and air gap associated therewith. Further, the path 48 may extend through a portion of the material making up the stem 32 thus further attenuating the radiation. The presence of the directional shield 16 may prevent radiation from the second radiation source 40 from reaching the detector 14 through the air gap associated with the aperture 18. The detector 14 will thus not record radiation of the second radiation source 40 through the aperture 18.

The dimensions of the directional shield 16 can be varied so that any sized field of view 22 is achieved. For instance, if the second radiation source 40 and path 48 were angled from the axis 50 through the origin 52 at an amount of 24° or greater then radiation from the second radiation source 40 through the aperture 18 would not be visible to the detector 14. In this arrangement, the first angle 42 would be 24°, and the second angle 44 could be a similar amount (24°) so that the field of view 22 would be 48°. With such an arrangement, if the first radiation source 20 and path 46 were situated at an angle of 12° from axis 50 through the origin 52 then it would be sensed by the detector 14 through the aperture 18.

The shape of the directional shield 16 may be dependant on the diameter of the aperture 18, the shape of the collimator shield 12 such as planar or spherical, and the desired field of view 22. The collimator shield 12 may have an outer surface 54 that is convex in shape and an inner surface that is closer to the detector 14 and is concave in shape. The aperture 18 can be selected so that it is of a diameter that provides a desired line of sight. This line of sight can be selected so that very low energy gammas will still generate a dose rate into the detector 14 up to the maximum desired field of view 22. Next, starting at the 2D center of the aperture 18 the length of the air gap through the aperture 18 at angles beyond the field of view 22 can be determined. This allows for the determination of the amount of additional attenuating material needed on the outside of the aperture 18. This additional material can be added radially around the aperture 18 to produce a symmetric shape around aperture 18. With the directional shield 16 in place and with a second radiation source 40 outside the desired field of view 22, the detector 14 material in line with the aperture 18 and the second radiation source 40 has a similar amount of attenuating material to the second radiation source 40 as the neighboring detector 14 material under the solid portion of the collimator shield 12.

The directional shield 16 can be included with all of the apertures 18 of the collimator shield 12, or may be included with less than all of the apertures 18. The directional shield 16 may work with any collimator shield 12 material type, collimator shield 12 thickness, aperture 18 diameters, and field of view 22. If the attenuating properties of the directional shield 16 do not match that of the collimator shield, the thickness of the directional shield 16 as measured radially from the axis 50 may be increased or decreased to match the attenuating properties of the solid portion of the collimator shield 12.

Figure 6:
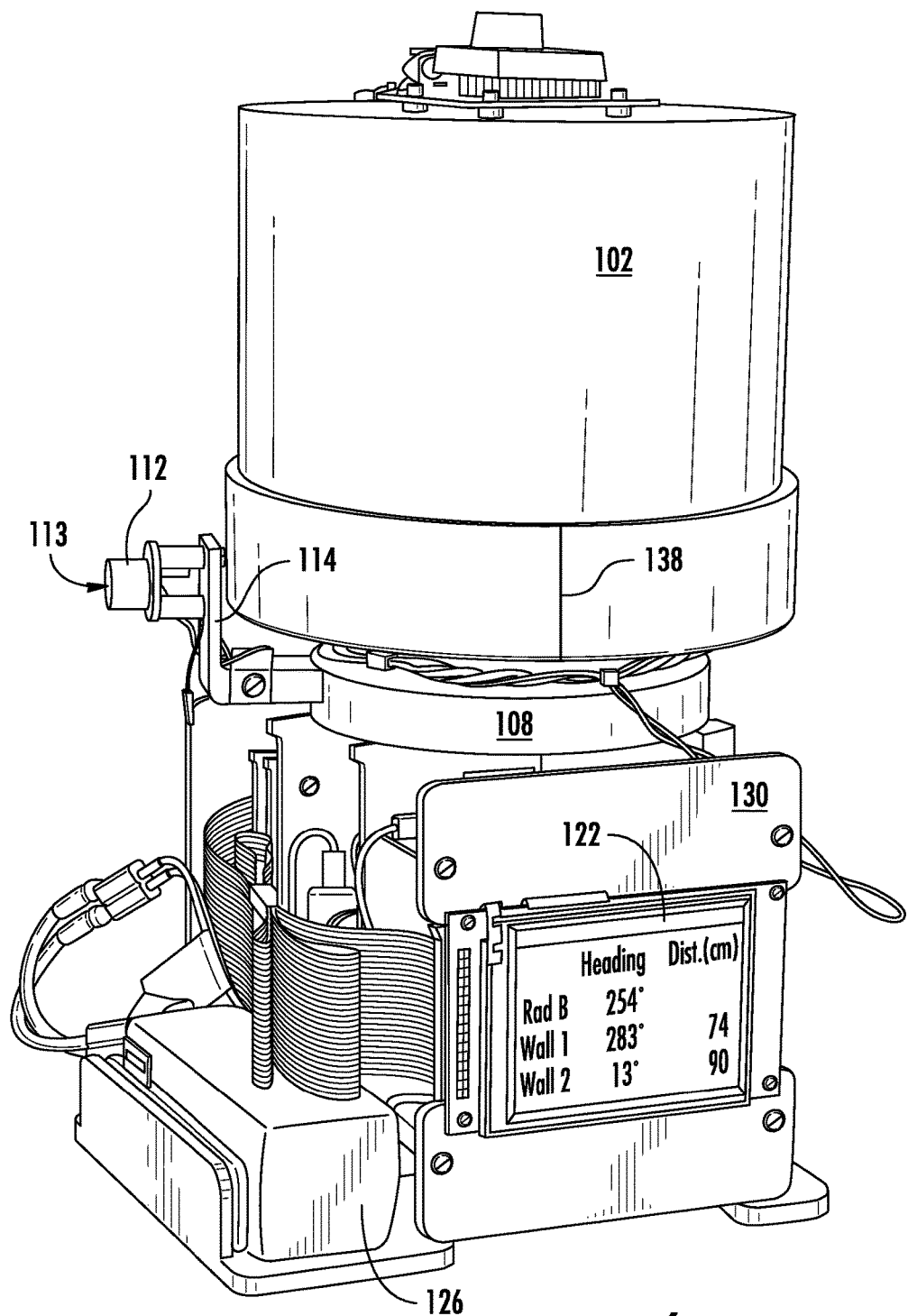
FIG. 6 is a perspective view of a position determination system in accordance with one exemplary embodiment.

The detector 14 may not contain electronics or other mechanisms capable of determining its location and orientation within a contaminated room. A position determination system 100 may be provided in order to help ascertain the location and orientation of the collimator 10 within a room. One exemplary embodiment of a position determination system 100 is illustrated in FIG. 6. The position determination system 100 may have a base 130 that may measure approximately 8"×8" such that the footprint of the position determination system 100 is 8"×8". The height of the position determination system 100 may be 16" in accordance with certain exemplary embodiments. An LCD screen 122 is located on a side of the base 130 and may be touch sensitive so that the user can cycle through menus to obtain information and issue commands to the position determination system 100. A distance sensor 112 is included and is capable of rotating 360° about the position determination system 100. The distance sensor 112 is used in order to determine the distance from the position determination system 100 to a wall or other surface. Although described as being a distance sensor 112, it is to be understood that the sensor 112 may be variously configured in other arrangements. The distance sensor 112 may be an ultrasonic sensor in one embodiment. In another embodiment, sensor 112 may be a laser sensor.

Figure 7A:
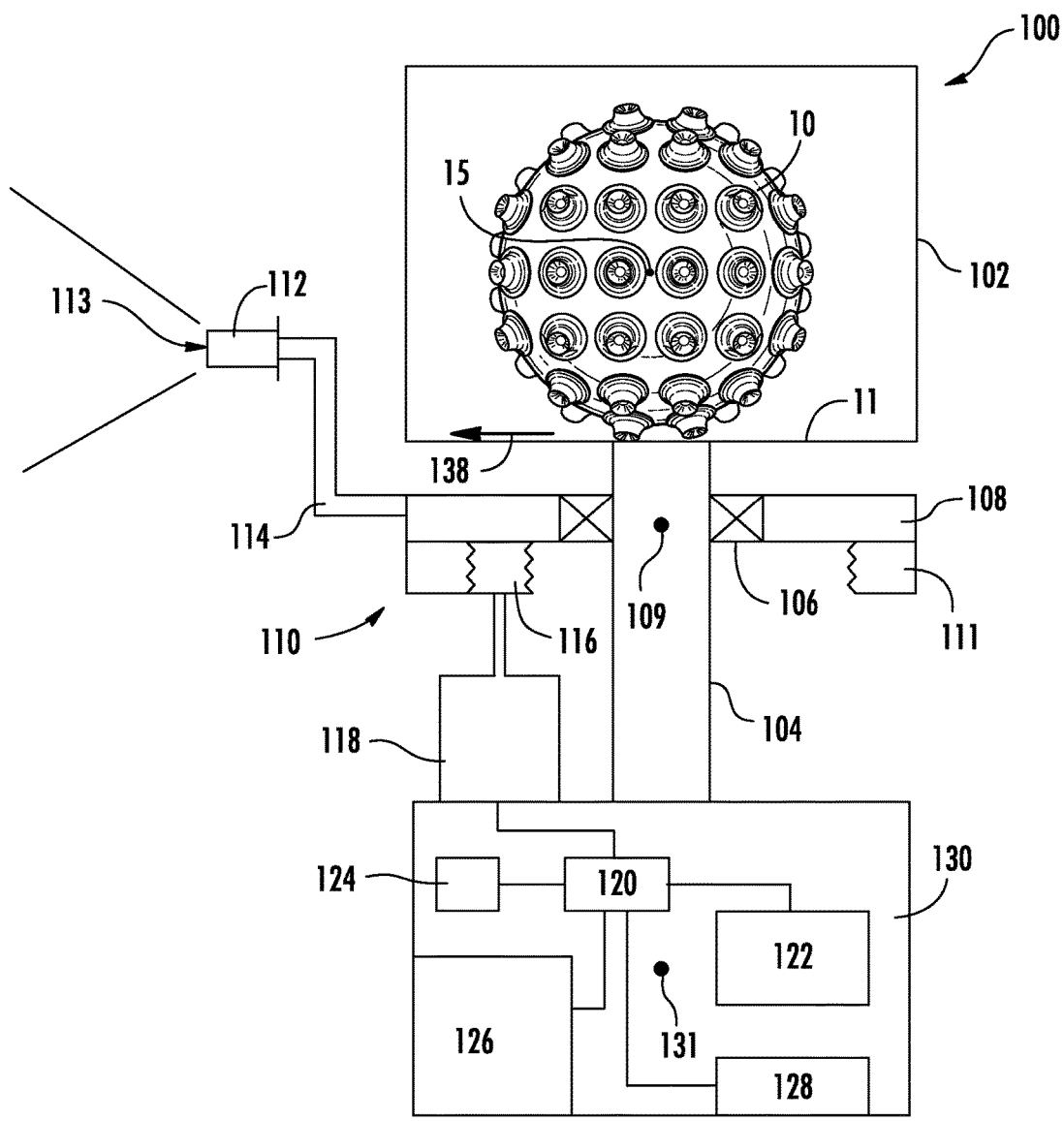
FIG. 7A is a side elevation view partially in cross-section and schematic form of a position determination system in accordance with another exemplary embodiment.

The distance sensor 112 is capable of rotating a distance of 360° without any obstruction in the way of the sensor 112 as it looks outward from its center of rotation. The system 100 may be constructed so that the sensor 112 is afforded an unobstructed view about its entire range of motion. A collimator cover 102 is located at the top of the system 100 and houses a collimator 10. Although covered, the collimator cover 102 may allow certain types of radiation to pass therethrough so that the detector 14 can in fact record radiation presence and intensity. The collimator 10 may thus be afforded an unobstructed view by the system 100 with respect to the radiation it is attempting to detect. With reference now to FIG. 7A, a schematic drawing of one exemplary embodiment of the system 100 is shown. The collimator 10 includes a base 11 that may be non-removably attached to the collimator shield 12. The collimator shield 12 can be disassembled such that its upper hemisphere can be removed from its lower hemisphere to access the detector 14 located within. The collimator cover 102 can surround the collimator 10 such that no portion of the collimator 10 is visible from outside of the collimator cover 102. The collimator 10 and collimator cover 102 can be arranged so that they do not rotate with respect to base 130. In this regard, a main shaft 104 may extend from the base 130 and can support the collimator 10 and collimator cover 102. The main shaft 104 can be arranged so that it does not rotate but is instead rigidly attached to the base 130.

The distance sensor 112 can be rendered rotatable in a variety of manners. One such method is shown in FIG. 7A in which a rotating disk 108 is present and is rotatably mounted onto the main shaft 104 by way of a bearing 106. A mount 114 extends from the rotating disk 108, and the distance sensor 112 is attached to the end of the mount 114. The distance sensor 112 may be in wireless communication with a CPU 120 (central processing unit) or can be in communication therewith through a wired connection. A planetary gear arrangement 110 may be used to drive rotation of the rotating disk 108. The detector 14 may be located completely above the planetary gear arrangement 110. The planetary gear arrangement 110 may include an outer gear 111 that is rigidly attached to the bottom of the rotating disk 108. The outer gear 111 has gearing on its inner surface and can extend for 360° about the inner surface of the outer gear 111. A planetary gear 116 engages the gearing of the outer gear 111 and is driven by a stepper motor 118. The planetary gear 116 may be located so that it is not coaxial with the outer gear 111 and may be a pinion of the stepper motor 118. The planetary gear 116 is rigidly connected to the drive shaft of the stepper motor 118 so that rotation of the drive shaft causes a corresponding rotation of the planetary gear 116 which in turn causes rotation of the outer gear 111 through its geared arrangement. Since the distance sensor 112 is rigidly attached to the outer gear 111, it will be rotated as well upon rotation of the outer gear 111.

The distance sensor 112 may thus be rotated about the stationary main shaft 104. The main shaft 104 and stepper motor 118 may both be mounted onto the base 130, and in the schematic diagram shown are mounted to a top plate of the base 130. Other mounting positions may be made in other arrangements. The position determination system 100 includes additional components that may be mounted or located in or on the base 130. A CPU 120 may be powered by a lithium-polymer battery 126. The battery 126 may be strong enough to power the system 100 so that it can determine the location and orientation of the detector 14 and store this data to a non-volatile memory 128 or otherwise transfer this data to a remote location. The lithium-polymer battery 126 may be capable of running the system 100 for 8 hours in accordance with certain exemplary embodiments.

A digital compass 124 can be in communication with the CPU 120. Non-volatile memory 128 may likewise be in communication with the CPU 120 in order to store data generated by the position determination system 100. The LCD screen 122 may be in communication with the CPU 120 in order to both display output from the CPU 120 and to input commands from the user into the CPU 120. It is to be understood that the components shown in communication with the CPU 120 may also be in communication with one another directly, or through CPU 120, in other exemplary embodiments. Further, the stepper motor 118 and distance sensor 112 may be controlled by the CPU 120 and may send information back to the CPU 120. The various communications between the various components of the position determination system 100 may be accomplished through hard wired and/or wireless connections.

Although described as having the detector 14 above the rotating disk 108, and generally vertically higher than the distance sensor 112, other arrangements are possible in which the detector 14 is located completely below the rotating disk 108 and completely vertically lower than the distance sensor 112. In still other versions, the distance sensor 112 can be located vertically at the midpoint of the detector 14 and can rotate around the midpoint of the detector 14.

Figure 10:
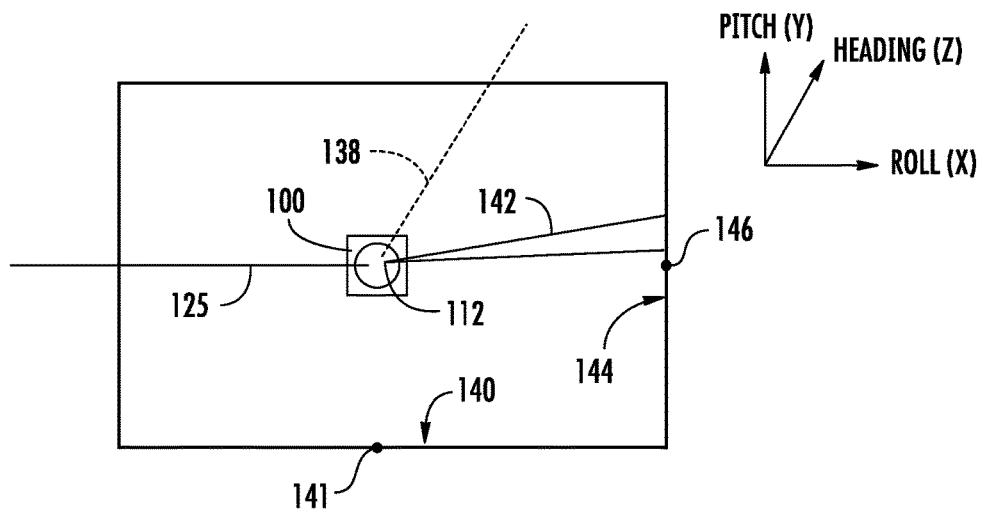
FIG. 10 is a top plan view of a position determination system deployed into a room in accordance with one exemplary embodiment.

The system 100 can be variously configured so that it is capable of determining the distance from any component of the system 100 to the walls of the room the system 100 is in, or to objects located within the room. During rotation of the distance sensor 112, the software of the system 100 constantly monitors the distance data to determine the angle to the closest wall. As shown in FIG. 10, the distance sensor 112 may emit a cone shaped sound wave 142 to search for objects 140. The object 140 shown as being located is a wall 140, although the object 140 could be a chair, glovebox, computer, or any other object in other arrangements. The range of the cone of the distance sensor 112 may be from 20-765 centimeters. Due to this cone shape, and the distance sensor's one centimeter accuracy, it will report the same distance to the closest wall some distance before and after the actual closest point as it moves a specific angle. The true closest distance is half of this angle and is the point on the wall perpendicular to the distance sensor's 112 center line. This position is the one reported by the system's 100 software. With reference back to FIG. 7A in addition to FIG. 10, after completion of the scan, the distance sensor 112 is moved to point to the closest wall 140 and the compass angle reported by the digital compass 124 and distance to a point 141 of the wall 140 that is closest to the detector are displayed on the LCD screen 122 along with the digital compass 124 angle of the detector 14 orientation line 138. A 0° reference line 125 of the digital compass 124 can be noted and the various compass angles to the orientation line 138 and objects 140, such as the compass angle of the closest point 141 of wall 140, can be measured from this reference line 125. The distance sensor 112 may then rotate to a wall 90° from this angle, that is the angle of the closest wall, and the distance can be measured and displayed along with the digital compass 124 angle and distance. This second object 144 may be a second wall 144 that is 90° to the first wall 140 and a point 146 of the second wall 144 may be the distance that is measured by the system 100. The angular orientation of the point 146 of the second wall 144 may also be measured by the system 100 and reported along with the distance. The position and orientation information is stored on the non-volatile memory 128 for later retrieval, and can remain ready for subsequent retrieval even if the lithium-polymer battery 126 dies.

The compass angle of the various points and lines may be an angle that informs one of the pitch and roll location of the points and lines. As shown in FIG. 10, a top view of a room is shown and the pitch and roll directions are the X-Y coordinates of the room such that the compass angle represents an orientation in a plane of the room. The orientation may also include the heading. The heading is the Z direction/up down direction in the room. It may be assumed in most instances that the orientation line 138 and other points and lines are horizontal so that they do not have a component in the Z or up/down direction. The compass angle would then yield the full orientation (heading, pitch, and roll) of the point or location. However, in other embodiments, the orientation line 138 may be pointed in an upward or downward direction so that its proper orientation must include a component in the X, Y and Z directions. The digital compass 124 may measure this component in the Z or up/down direction. As used therein the term angular position may simply be a position of an object 140 or line in the pitch and roll direction knowing that its heading is 0° or horizontal. However, the term angular position may also refer to the position of an object 140 or line in which the heading, pitch, and roll all have some component or in which one or more of them have a 0 component. As used herein, the term orientation may refer to the heading, pitch, and roll of the line or object. The term compass angle may refer to only two of the axes as the third, for example the heading, may be understood to be 0 or horizontal. However, the term compass angle may in other arrangements refer to the heading, pitch, and roll such that all of these have some component or in which one or more of them have a 0 component. The digital compass 124 or some other device may be used to determine the heading, pitch, and roll orientation. As such, the X, Y, and Z directional orientation of the orientation line 138, objects 140, closest points 141, or other objects 140, lines or points may be determined.

The system 100 may recognize two special cases. The first special case may be when the detector 14 is placed equidistant between two walls. In this case, the system 100 must be able to separate measurement data to distinguish between the two walls. The second special case may be when the closest distance to a wall is at the start of the scan or is at the end of the scan. This situation results in the home position pointing towards the closest wall, and results in having to combine data from the start and end of the scan in order to find the correct perpendicular angle to the wall.

The position determination system 100 may be set up so that when first turned on, a screen appears on the LCD screen 122 that gives the operator the ability to choose a "Count Down Time." This "Count Down Time" introduces a time delay during which the system 100 can be deployed remotely via a crane, robot, etc. before it starts a scan. After the count down delay, the CPU 120 reads the digital compass 124 to record the orientation (heading, pitch, and roll) of the collimator 10 and included detector 14. This position may be classified as the "home position." The CPU 120 then takes distance sensor 112 readings as the stepper motor 118 rotates the sensor 112 in very small increments (for example 1° increments). This data will indicate the distance from the walls or objects to the center of the position determination system 100. Once a 360° scan is complete, software run by the CPU 120 saves the distance data and performs a wall finding algorithm to determine the perpendicular distance, which may be from the center of the system 100 to each detected wall, and the corresponding compass angle. The wall distances, compass angles and the orientation information are used along with the detector 14 data in order to map the detector's data on the walls, floor and ceiling. All data is stored to the non-volatile memory 128 which may be a secure digital memory card.

An exemplary embodiment for one algorithm performed by all or certain components of the system 100 for use in finding walls may be as follows:

1. The captured scan data is in polar form (angle, distance), so it must be converted to Cartesian (rectangular) coordinates (x, y). As this is being done, the greatest polar distance is noted and the corresponding Cartesian coordinate (called the "furthest point") is saved for later use.
2. This "furthest point" is near a corner, so it is a good starting point for the algorithm.
3. Select the next N points to be processed. A moving set of N points will be generated as the distance sensor 112 moves across the wall. Each time a set of N points is processed, it contains N-1 points from the previous time with only one new point. One point is dropped and one is added to each new set of N points. The following line (y=mx+b) for the current N points may be calculated in which:
   a. Slope=m: is determined through linear regression
   b. Y Intercept=b: is determined through linear regression
   c. Correlation Coefficient=$R^2$
   d. Perpendicular distance from the center of the position determination system 100 (X=0, Y=0) to the line above.
4. If $R^2$ is greater than or equal to the "$R^2$ Threshold", then the set of points fit well to a line and form the "current wall segment."
   a. If the last set of points is a wall segment, then the "current wall segment" is part of that same wall segment. In this case, the new point will be added to the last wall segment, and a recalculation of the statistics will be performed.
  b. If the last set of points is NOT a wall segment, then a determination is made to ascertain if the "current wall segment" is on the same line as an "old wall segment". This may be done by comparing the slope and y-intercept of all "old wall segments" to the "current wall segment".
    i. If an "old wall segment" and the "current wall segment" are part of the same line, then the points of the "current wall segment" are added to the points of the "old wall segment", and the statistics are recalculated.
    ii. If the "old wall segment" and "current wall segment" are not on the same line, then the "current wall segment" points are placed in a "new wall segment" and the statistics are recalculated.
5. If $R^2$ is less than the "$R^2$ Threshold", then the set of points did not fit well to a line. An indication may be made that the last set of points is not a wall segment.
6. If all points have been processed, go to step 7, else go to Step 3.
7. All of the wall segments must be searched to find the true walls.
  a. Sort all wall segments by their slope to obtain parallel wall segments.
  b. Sort parallel wall segments by their y-intercept to obtain wall segments on each side of the room.
  Sort each of the side wall segments by distance to find the one that is furthest away which will be the true wall.
8. For each of the true walls found, calculate the compass angle in degrees of a line from the center of the system 100 [the origin (0,0)] and perpendicular to the true wall. At this point the algorithm has already calculated the distance from (0,0) to the wall.
  a. Calculate the equation of the line through point (0,0) that is perpendicular to the true wall line.
    i. Find the perpendicular slope ($m_p$): This slope is the negative reciprocal of the true wall slope ($m_t$): $m_p = -1/m_t$
    ii. Use the Point-Slope Line Form to find the equation of the perpendicular line $y - y_1 = m_p(x - x_1)$. Here $(x_1, y_1) = (0,0)$, and the equation is $y = m_p x$
  b. Calculate the intersection point of the true wall line ($y = m_t x + b_t$) and the perpendicular line through (0,0).
    i. Set the equation of the true wall line equal to that of the perpendicular line and solve for x.

$$m_p x = m_t x + b_t \qquad 1.$$

$$(m_p - m_t) x = b_t \qquad 2.$$

$$x = b_t / (m_p - m_t) \qquad 3.$$

ii. Substitute the x value into one of the line equations to find y. The equation that may be used for this is $y = m_p x$.
  c. Use the Atan 2(x,y) function to calculate the angle θ from (0,0) to the intersection point (x,y). This calculation will result in an answer that will be $-\pi \leq \theta \leq \pi$, where θ is in radians.
  d. Convert radians to degrees: degrees=radians*(180/π)
9. Therefore, for each true wall, the algorithm has determined the perpendicular distance from the origin to the wall, and the compass angle.

It is to be understood that the aforementioned algorithm for determining the perpendicular distance from the origin to the wall and the compass angle is only exemplary and that other algorithms for ascertaining this information may be possible. The algorithm can be carried out by any portion of the system 100 such as the CPU 120, digital compass 124, LCD screen 122, distance sensor 112, rotating disk 108, stepper motor 118, and non-volatile memory 128. These components need not be used in other algorithms for use in obtaining the aforementioned information. The distance and angular readings may be used to determine the location and orientation of the detector 14, collimator 10, and/or system 100 within the room. As such, the measurements may be applicable to any of the portions of the system 100, including the carried collimator 10 and detector 14.

The various measurements may be thought of as having the position determination system 100 as its origin. As such, if an object 140 is measured to be five feet, it will be five feet from the position determination system 100. However, it may be the case that a more precise origin is desired than the position determination system 100 in general. For example, the origin may be defined as being a center 15 of the detector 14. The detector 14 in one embodiment may be a radiosensitive detector material that is in the shape of a sphere that is sensitive to radiation, and the center 15 may be the physical center of this sphere. In other embodiments, the origin may be a face 113 of the distance sensor 112, a longitudinal axis of the main shaft 104, a center of rotation 109 of the rotating disk 108, or a mark or other location on the base 130 such as a center 131 of the base 130. Any part of the system 100 may be the origin in yet other arrangements.

The detector 14, collimator 10, and/or position determination system 100 may have an orientation line 138. This line can be etched or otherwise noted on the collimator 10, detector 14, base 11, collimator cover 102, or any other portion of the system 100. This orientation line 138 may help to properly orient the detector 14 and collimator 10 with respect to the system 100 and/or the room into which it is placed. A reading from the digital compass 124 may indicate to which wall in the room the orientation line 138 is pointing. The orientation line 138 may be matched with a mark on the collimator cover 102 or other portion of the system 100 so that the proper positioning of the detector 14 is noted upon determining the wall and angular orientations via the algorithm. Since the relative position between a face 113 of the distance sensor 112 and the center 15 of the detector is known, the system 100 may function to determine the location of the center 15 of the detector 14 relative to the walls of the room it is in and the angle the orientation line 138 is pointing to in the room.

Figure 7B:
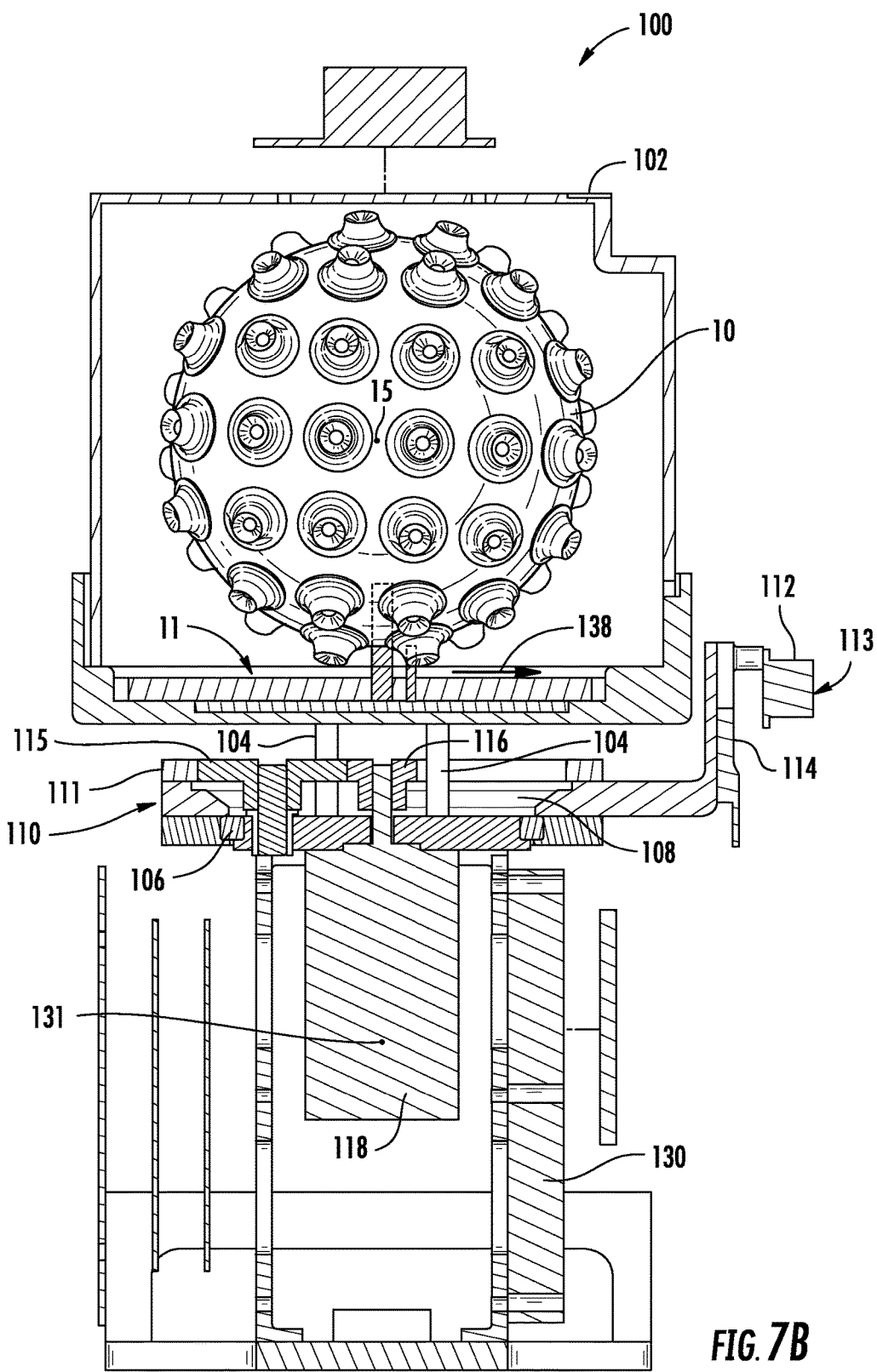
FIG. 7B is a side elevation view partially in cross-section and schematic form of a position determination system in accordance with a different exemplary embodiment.

It is to be understood that the arrangement illustrated in FIG. 7A of the position determination system 100 is only exemplary and that others are possible in accordance with other exemplary embodiments. For example, FIG. 7B discloses an alternative arrangement of the position determination system 100 in which the planetary gear arrangement 110 is varied from that shown in FIG. 7A. The stepper motor 118 is centrally located so that the pinion 116 rotates about a central axis of the position determination system 100 and is coaxial or in line with the center 15 of the detector 14. A main shaft 104 located at the center of the system 100 is not present. The pinion 116 rotates and in turn drives an idler gear 115 that is mounted to the base 130. An outer gear 111 engages the idler gear 115 and is driven by the idler gear 115. The outer gear 111 is rigidly attached to the rotating disk 108.

A bearing 106 is present and the rotating disk 108 is mounted thereon so that the rotating disk 108 can rotate with respect to the base 130. A pair of main shafts 104 may be included and may be arranged to allow the collimator 10, base 11, and collimator cover 102 to remain stationary and thus rigidly attached to base 130 while the rotating disk 108 and sensor 112 rotate relative to the base 130 and the collimator cover 102. In other exemplary embodiments, the collimator 10, base 11, and collimator cover 102 are rigidly attached to the rotating disk 108 and thus rotate with respect to the base 130. Although not shown in FIG. 7B, the CPU 120, LCD screen 122, digital compass 124, lithium-polymer battery 126, and non-volatile memory 128 may also be present. The various components of the position determination system 100 may function and be arranged as those previously described with the embodiment of FIG. 7A and thus a repeat of this information is not necessary.

The walls 140 described as the objects that are measured may be the side walls of a room into which the position determination system 100 is deployed. The position determination system 100 may be capable of detecting distances and orientations associated with the ceiling and floor of the room into which the position determination system 100 is located. Here, the distance sensor 112 may project sound waves onto the floor and ceiling in order to measure the floor and ceiling in a similar manner as previously described. As such, as used herein the objects 140 may include walls 140 of a room, and the walls 140 may include the side walls, ceiling, and/or floor in accordance with various exemplary embodiments. It is therefore the case that the term objects is broad enough to include walls and the term walls is broad enough to include ceilings and floors. In yet other arrangements, knowledge of the position and orientation of the side walls 140 allows the position determination system 100 to infer the location and orientation of the floor and ceiling because these two surfaces are contiguous with the side walls 140 of the room on all of their sides. As such, in other embodiments of the position determination system, the distance sensor 112 does not directly measure the ceiling and floor of the room.

Although described as being used in connection with a detector 14, the system 100 may be used without the detector 14 and/or collimator 10 to determine wall and object distance and angular data. Other items, such as a camera or chemical detector, may be used in place of the detector 14 and/or collimator 10 in other exemplary embodiments. For example, the system 100 can be used in conjunction with any item or method in which data concerning position and/or orientation within a room is needed.

Figure 8:
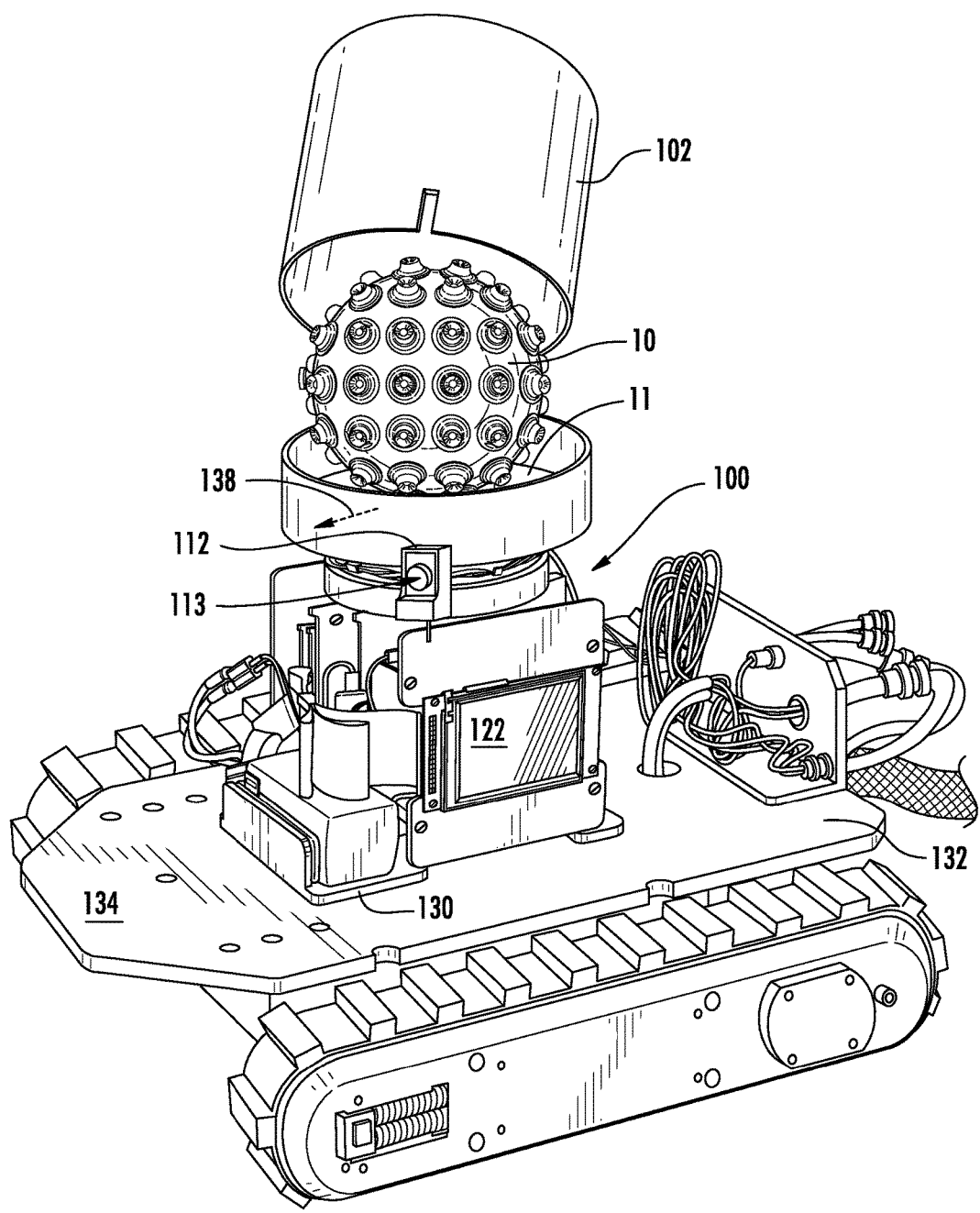
FIG. 8 is perspective view of a position determination system with a remote controlled device in accordance with another exemplary embodiment.

The position determination system 100 can be placed into a room in a variety of manners. One such deployment is shown in FIG. 8 in which a remote controlled device 132 is used to position the system 100 to a desired location within a room. The remote controlled device 132 has a pair of tracks that can be remotely controlled through either a wireless connection or a wired/tethered connection so that the user can move the remote controlled device 132 forwards or backwards. The tracks may also be used to turn the remote controlled device 132 so that the system 100 can be moved to a desired position within the room without the user having to enter the room.

The system 100 may be mounted to an upper surface 134 of the remote controlled device 132. The height of the upper surface 134 to the floor may be known and can be incorporated into the algorithm to know the elevation of the distance sensor 112 and center of the detector 14. The base 130 may be mounted to the upper surface 134 through the use of bolts or other mechanical fasteners or through a permanent/integral connection. The system 100 can be located on the upper surface 134 when the system 100 is used to obtain distance and angular measurements. Alternatively, a crane or other device may be used to remove the system 100 from the remote controlled device 132 before the measurements are taken. The system 100 may thus be rendered mobile via the remote controlled device 132 to provide greater functionality.

Figure 9:
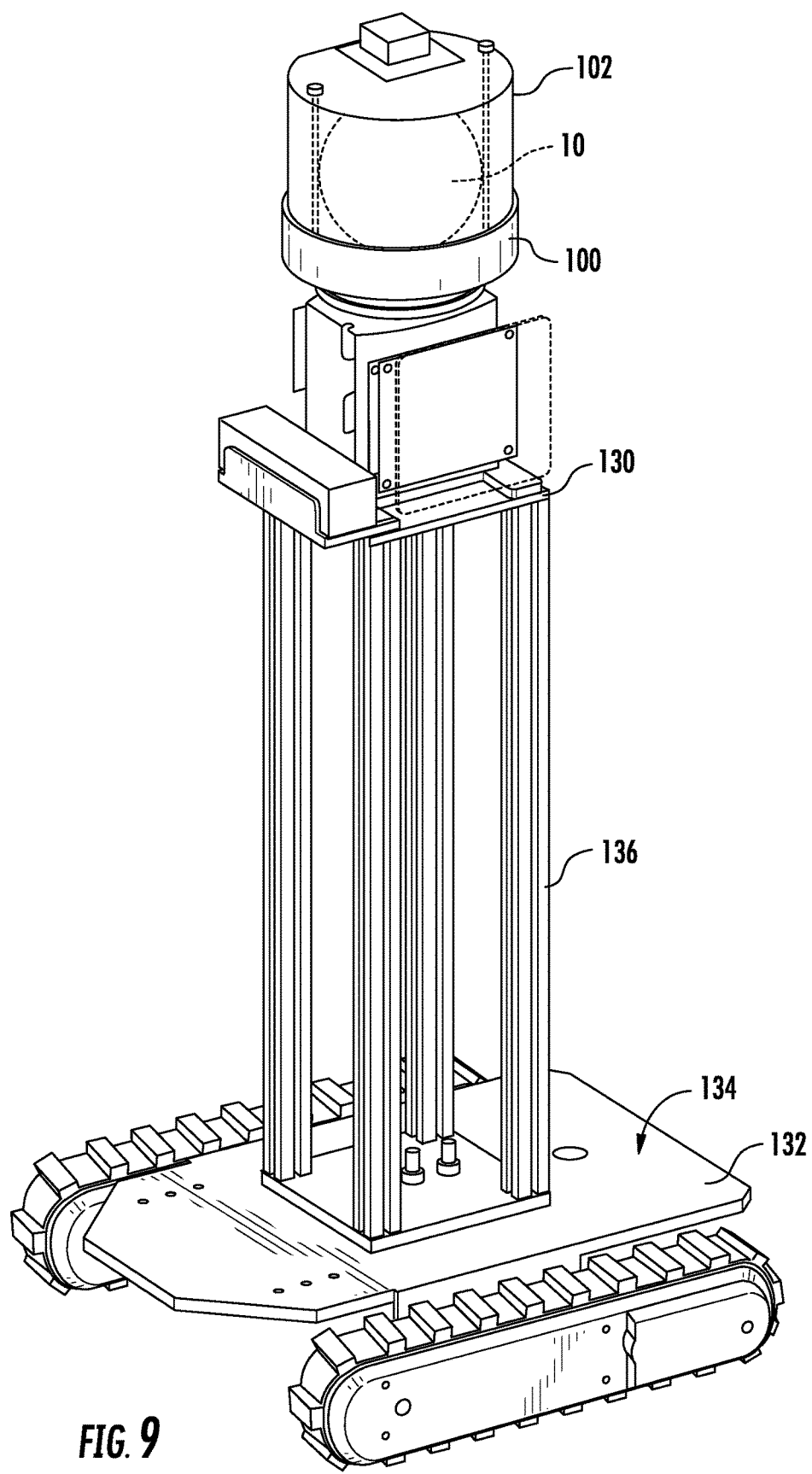
FIG. 9 is a perspective view of a position determination system with a remote controlled device and a vertical positioning system in accordance with another exemplary embodiment.

An alternative exemplary embodiment is shown with reference to FIG. 9. Here, a remote controlled device 132 is present and can be moved remotely by the user as previously discussed. A vertical positioning system 136 extends upwards vertically from the upper surface 134. The base 130 of the position determination system 100 is mounted to the top of the vertical positioning system 136. The vertical positioning system 136 is present in order to increase the height of the system 100 to place the detector 14 and distance sensor 112 at an elevated location. Again, knowledge of the amount of elevation can be incorporated into the system 100 so that it knows its elevation from the floor. Elevation of the location of components of the system 100 such as the detector 14 and/or distance sensor 112 may allow them to more easily view radiation and/or walls without being obstructed.

The vertical positioning system 136 can be rigid in natures such that its height does not change. As shown, the vertical positioning system 136 may include four columns, however it is to be understood that any number of members capable of elevating and supporting the system 100 can be used. In other embodiments, the vertical positioning system 136 may include one or more telescoping members that allow the user to adjust the vertical positioning of the system 100. A motor, piston, or other member can be attached to the upper surface 134, the base 130, and/or to the vertical positioning system 136 to effect raising and lowering of the system 100.

A detector 14 may include material that provides a differential output based on exposure to radiation. This differential output may be changes in optical density, color, or temperature. The changes may also be in electron shell configurations, chemical composition, or some other physical or chemical alteration based on radiation exposure. The detector 14 materials may be 3D or 2D, and this selection may depend on the application, the means of extracting data, or on the final result desired. The materials of the detector 14 can be exposed bare or can be collimated to provide better directional sensitivity.

An automated method may be provided in order to extract source location of radiation, energy of radiation, and radiation intensity from a collimated exposed detector 14 material. The method may work for nearly any detector 14 material that can be read or scanned into a computer data file, and the method may provide a 3D or 2D matrix of exposure values as integers or floating point numbers.

Input information may be obtained from the position determination system 100 and/or the detector 14. In this regard, a user may place the position determination system 100 with included detector 14 into a room that features some amount of radiation contamination. The room may be an isolator, a shielded cell, a glove box, or a fume hood in accordance with various arrangements. After the position determination system 100 has obtained its distance and orientation readings, and after the detector has been exposed to the radiation for a sufficient amount of time, the position determination system 100 and/or detector 14 may be removed from the room for subsequent analysis.

Figure 11:
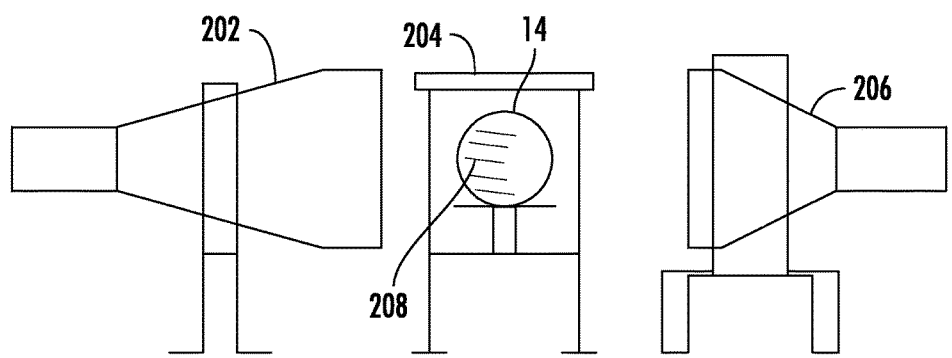
FIG. 11 is a side elevation view of an apparatus used for obtaining radiation data from a detector.

One such apparatus for analyzing the detector 14 may be shown with reference to FIG. 11. Here, the detector 14 may be removed from the collimator shield 12 and placed into an aquarium and rotation stage 204. Upon exposure to radiation, streaks 208 will be imparted into the detector 14 material and will be more opaque when exposed to a greater amount of radiation. The streaks 208 will point to or otherwise be in the direction of the radiation source or sources that contributed to their creation. The detector 14 may thus yield information on the intensity and location of radiation sources. An optical-CT scan may be conducted as shown in FIG. 11 in order to withdraw information from the detector 14. The detector 14 may be positioned between a telecentric light source 202 and a telecentric lens 206, and the optical-CT scan may return a matrix of radiation induced changes in optical attenuation coefficients. The change in degree of opaqueness is proportional to the locally absorbed does of radiation.

Figure 12:
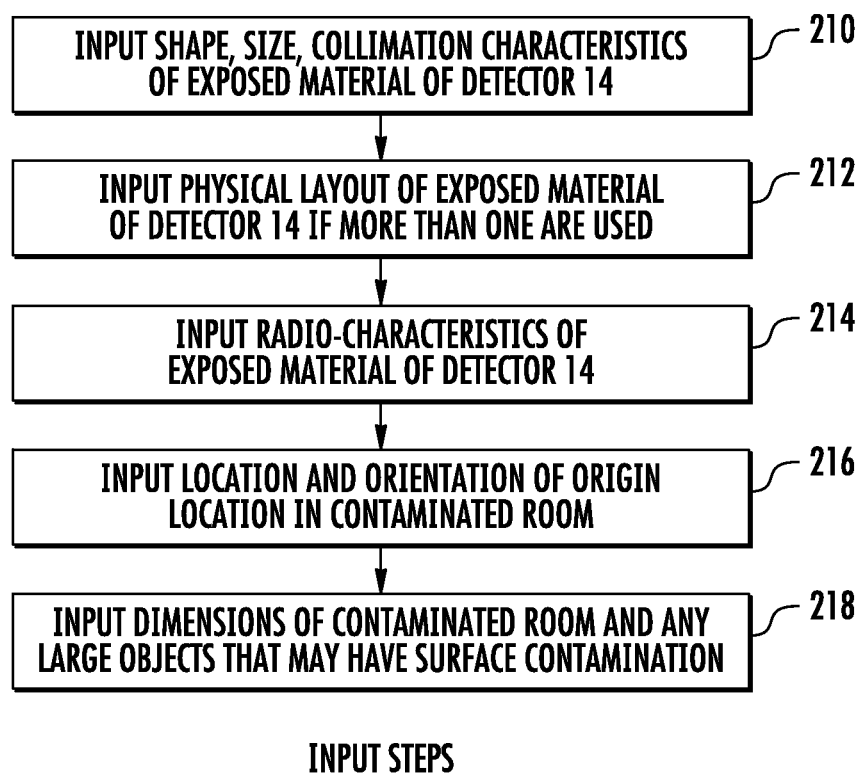
FIG. 12 is a series of input steps for providing information to a back-projected radiation analyzer and cell evaluator method in accordance with one exemplary embodiment.

A back-projected radiation analyzer and cell evaluator method 200 will now be described. Such method can be run on a computer and may be completely automatic, or primarily automatic requiring a minimum of human input. In other arrangements, the method 200 may require a significant or substantial amount of human input. The method 200 will first require the input of certain information. FIG. 12 illustrates various input steps that may be performed in order to provide the method 200 with processing information.

Step 210 includes the input of the shape, size, and collimation characteristics of the exposed material of the detector 14. The exposed material of the detector 14 may be a spherical ball, and the diameter of such detector 14 can be input along with any other physical characteristics such as the size and location of any flat outer surfaces should the detector 14 not be completely spherical. The radiosensitive detector material characteristics of the detector 14 can be input if the detector 14 is in fact of such a composition. Also, if more than one detector 14 is used, the physical layout of this additional detector(s) may be provided to the method 200 as shown in step 212.

An additional input step 214 may be performed in which the radio-characteristics of the exposed material of the detector 14 are provided to the method 200. These characteristics may be the output of the optical-CT scan of FIG. 11 in which the amount of opaque material along with its shape, direction, and intensity is determined. Input step 216 may be performed in which the location and orientation of the detector in the contaminated room is provided to the method 200. This input may be the output of the position determination system 100 in which the distance and orientation (heading, pitch, roll) to an origin and of an orientation line 138 are provided. The orientation line 138 may correspond to a particular orientation of the detector 14 so that the particular orientation of the detector 14 in the contaminated room may be determined.

An additional input to the method 200 may be provided as shown in step 218 in which the dimensions of the contaminated room and the dimensions of any large objects in the contaminated room are provided. The large objects may be those large enough to accumulate surface contamination thereon. It is to be understood that the list of inputs in FIG. 12 is only exemplary and that others may be added or some of those shown may be deleted. For example, the location of the characterizer (origin point determined) and the dimensions of the contaminated room and large objects may be omitted from being provided as input. In these instances, the method 200 may still function to provide proper output, but the processing time may increase due to the algorithm cycling through all possible 3D locations in the contaminated room instead of just on the surfaces of objects.

Figure 13:
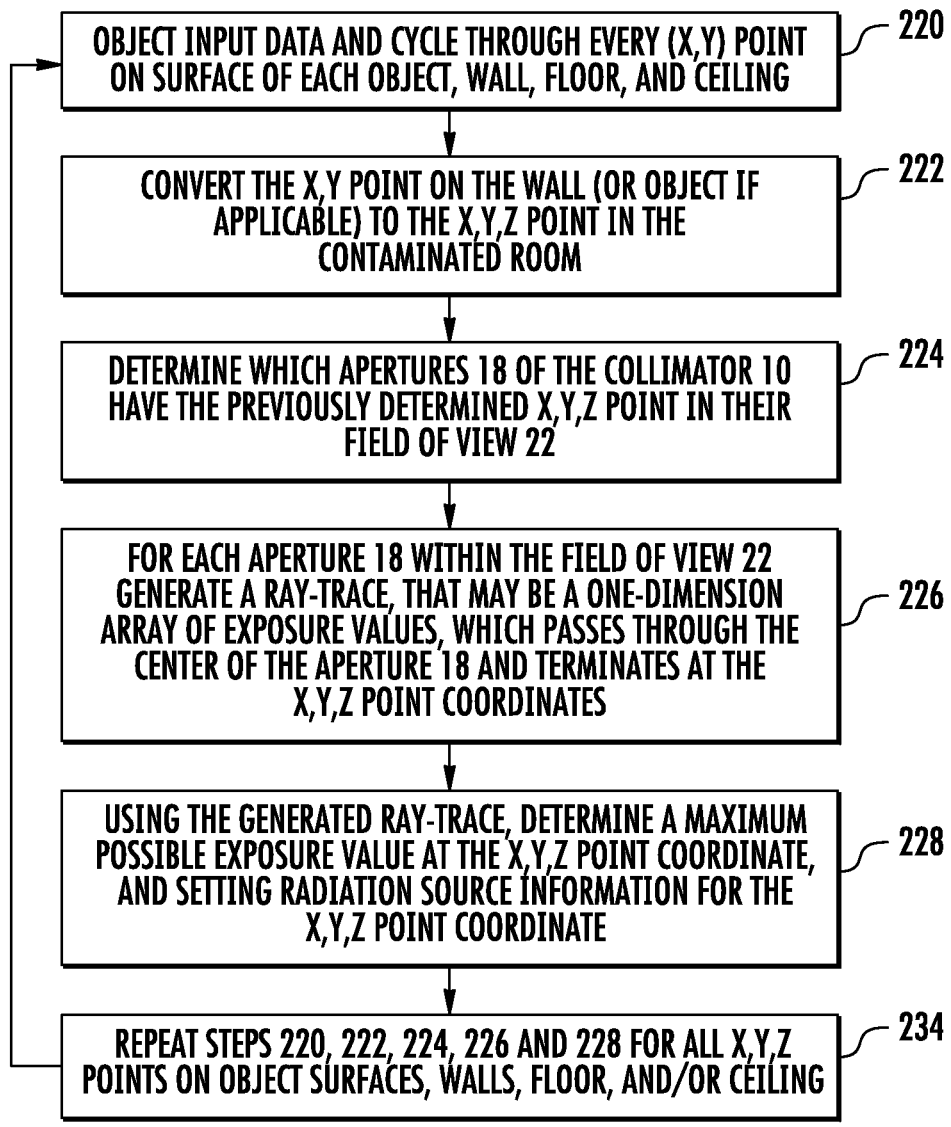
FIG. 13 is a series of process steps for processing information in the method noted in FIG. 12.

The method 200 may proceed to a series of processing steps shown for instance in FIG. 13 in which the input data is analyzed by an algorithm that can be carried out by a computer. In step 220, input data, for example input information as previously discussed with reference to FIG. 12, may be provided to the method 200. This input data may be data on the contaminated cell and objects inside of the cell such as tables and drums. The method 200 may cycle though every X,Y point on each wall and on the floor and/or ceiling depending upon the particular detector 14 deployment orientation. The X,Y points that are processed may also be X,Y points located on objects within the contaminated room.

Moving to step 222, the method may then look at the current X,Y point and determine whether an object is between the detector 14 and the point, and if so the point on the object closest to the detector 14 is used. The X,Y point on the wall (or object if applicable) is then converted to an X,Y,Z point in the contaminated room. In accordance with certain exemplary embodiments, this step 222 is optional and need not be implemented. Instead, the method 200 may move directly from step 220 to step 224 without conducting step 222. The method 200 may then perform step 224 in which the method 200 determines which aperture 18 of the collimator 10 has the X,Y,Z point just determined within their particular field of view 22. The particular fields of view 22 may be input to the method 200 in a collimator editor of a software package used to implement the method 200. This step 224 may be performed by knowing the location and collimation data of the characterizer.

The method 200 may then move onto step 226 in which for each aperture 18 within the field of view 22 a ray-trace is generated. The ray-trace may be a one-dimension array of exposure values obtained from the detector 14 material by a linear scan through the 3D material of the detector 14 or through layers of 2D material if such is used as the detector 14. The ray-trace may be generated through data obtained via analysis of the detector 14, such as that obtained through the set-up of FIG. 11, and can pass through the center of the aperture 18 and may terminate at the X,Y,Z coordinates of the point currently being evaluated. In certain embodiments, the ray-trace may extend from the center 15 of the detector 14 through the center of the aperture 18 and to the X,Y,Z coordinates of the point currently being evaluated.

Figure 15:
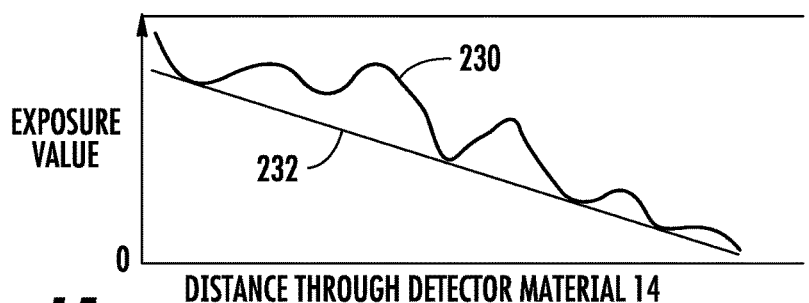
FIG. 15 is a line diagram illustrating a minimum fit line of data points of a ray-trace in accordance with one exemplary embodiment.

The method 200 may then perform a subsequent step 228 in which the maximum possible exposure that the ray-trace could have received is determined. With reference now to FIG. 15, a plot of the previously generated ray-trace is shown in which the data points 230 represent the exposure value of the ray-trace in view of the distance from the X,Y,Z point to the origin (center 15) of the detector 14. It may be assumed that the ray-trace has a continuous, although not necessarily linear, decrease in exposure as distance to the radiation source increases. The track shape of the ray-trace may be examined and a minimum fit line 232 or some other non-linear shape may be fitted to the ray-trace. The minimum fit line 232 may be a linear line that runs through the minimum dips or values of the data points 230 such that none of the data points 230 are located below the minimum fit line 232. The minimum fit line 232 may provide a maximum possible exposure value and a rough idea of the radiation source energy based upon the track shape of the ray-trace. The height of the minimum fit line 232 above the reference zero exposure value may be the maximum possible activity of a source at the X,Y,Z point.

The X,Y,Z coordinate point is set to have a radioactivity level of the minimum possible exposure levels. This is because given a real source at this 3D location, it will add an exposure amount equally to all apertures 18 within its field of view 22. The fact that some of the ray-traces indicate a higher exposure can be attributed to noise and tracks from other radiation sources in the contaminated room. Stated another way, there is no way for a radiation source of X intensity to produce ray-traces with an exposure less than X, but it is possible for some ray-traces to show exposure greater than X because of contributions from other radiation sources. It is therefore the case that the value determined is the maximum possible intensity of source at the 3D location.

Step 228 could alternatively be performed such that for the one-dimensional array previously generated in step 226, the method 200 calculates an inverse exponential fit line to the one-dimensional array data that is within the range of possible exposure energies. This minimum fit line provides the intensity of the radiation source based on the initial magnitude of the minimum fit line, and the energy of the source based upon the shape of the minimum fit line. From the list of inverse exponential fit lines, the line with the minimum source intensity is selected. This intensity value and energy is assigned to the X, Y point for the object/wall to which the ray-trace is directed.

The algorithm may make an assumption in order to extract valid and relevant data from the detector 14 material. First, it is asserted that the detector 14 material will provide an inverse exponential response to a radiation field, along a line that is parallel to the direction of the source. This assertion is assumed valid due to the nature of how all matter shields gamma radiation. All matter will shield gamma radiation by an inverse exponential equation, with some constant attenuation coefficient, over some variable distance. The detector 14 material will provide a similar exponential attenuation of the gamma radiation as a function of the distance traveled through the material. The magnitude of the exponential response is not only dependent on the material but also on the energy of the gamma radiation. Low energy gammas will be shielded much more quickly through a material than higher energy gammas, but will still provide an inverse exponential decrease. The speed at which the gammas are attenuated provides the "shape" data of the one-dimension array. This shape can be matched or interpolated to the input shape data to the algorithm to extract the energy of the source.

Calculation of the minimum inverse exponential line 232 may take into account any noise through the material along this line from other possible sources in the environment. It is asserted that an actual source in the direction of the line 232 will produce an inverse exponential line that cannot have any other "humps" or other anomalies midway through the line. The presence of any anomalies can be attributed to sources in other directions that are providing some radiation contribution through a small section of the line. These "humps" can be effectively ignored since an actual source in the direction of the line cannot produce a "hump" partially down the length of the line. The result of this analysis is a maximum possible intensity of a real source in the direction of the line and the likely energy of the source based on the shape of the line. The intensity value may be the maximum possible intensity of a real source in the direction of the line, and may not necessarily be the actual intensity of the source. This is because it is possible for the entire line to be flooded with noise from other sources in the environment. However, it is not possible for the source to be of greater intensity than the value derived, otherwise the magnitude of the inverse exponential fit line would have been greater.

After determining the maximum possible intensity of each one-dimensional array through the multiple holes that are within the FOV of a particular point, the minimum intensity from this list may be chosen as the intensity of a source at the point. Again, this chosen value is the maximum possible intensity of a source at the point. As an example, a particular point on a wall 140 has three collimator holes 18 within the field of view 22, and the three minimum inverse exponential fit lines give maximum possible source intensities of 100 mR/hr, 1000 mR/hr, and 2000 mR/hr. If a real source were to be at the particular point on the wall 140, it would contribute the same total dose rate to each of the three holes 18 equally. Because of the additive nature of radiation dose to the detector 14 material, it is not possible for one of the holes 18 to indicate an exposure rate less than the actual source intensity, but it is possible for some of the holes 18 to indicate an exposure rate greater than the actual source intensity due to noise from other sources in the environment. In other words, an actual source on this point of the wall that has intensity of 1000 mR/hr could not leave a collimator hole's 18 intensity value of <1000 mR/hr because the hole would be exposed to 1000 mR/hr at a minimum from this single source. Choosing the minimum intensity value of the list of collimator holes 18 within the field of view 22 provides the maximum possible value of a real source at the particular point.

The method 200 may move on to the next step 234 in which the method 200 then repeats the procedure for every X,Y,Z point that is input into the method 200. The steps 220, 222, 224 and 226 may be repeated for all X,Y points on each of the walls, ceiling and floor. Further, if objects other than the walls, ceiling and floor are in the contaminated room, X,Y points on the objects may be processed as well. After this processing, the method 200 may move onto the output stage as illustrated in FIG. 14.

The output of the method 200 may include a step 236 in which a series of two-dimensional images of the intensities at each X,Y point on the wall, ceiling, floor, and/or object are generated. Step 238 may also be performed by the process 200 in which a series of two-dimensional images are generated of the energies at each X, Y point on the wall, ceiling, floor, and/or object. Further, the process 200 may generate a text file with a specific format at step 240 that describes how to draw two-dimensional line drawings of the contaminated area on the walls, floor, ceiling, and/or objects.

Figure 16:
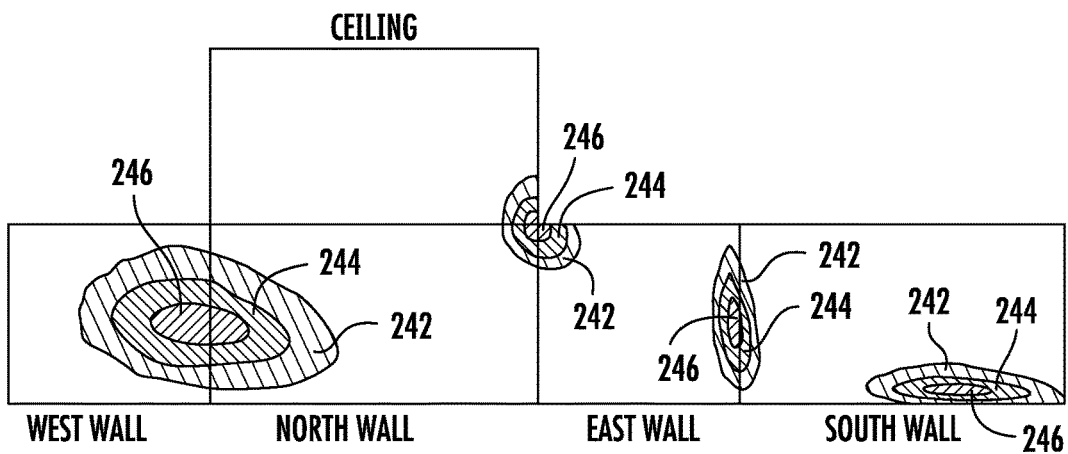
FIG. 16 is a mapping of radiation intensity on walls and a ceiling of a contaminated room.

Output of the method 200 may be illustrated as shown with respect to FIG. 16 in which radiation intensity is mapped on the walls and ceiling of a contaminated room in Sv/hr or any other desired dose rate unit. Although the floor is not illustrated, it may be mapped as well in other embodiments, along with objects located within the contaminated room. As shown, the radiation intensity is mapped such that a zone of low radiation intensity 242, a zone of medium radiation intensity 244, and a zone of high radiation intensity 246 is displayed. The various zones 242, 244 and 246 may be displayed in the form of colors, and a legend showing the strength of radiation intensity for the various colors may be provided as well. The areas between the borders demarcating zones 242, 244 and 246 may be filled with colors that show the various radiation intensities and their transition from one zone to the next. Although not specifically shown in FIG. 16, the colors may vary in strength within each one of the particular zones 242, 244 or 246. For example, the color in zone 246 can be of different shades or intensities at various locations within the zone 246 to show that the radiation is of different, particular intensity at the particular location within zone 246. As such, it is to be understood that the cross-hatching of zones 242, 244 and 246 in FIG. 16 dictates that different colors or intensities of colors can be found even within each zone 242, 244 or 246 to instruct one as to different locations and intensity of radiation within the zones 242, 244 and 246. It is to be understood that the graphical output illustrated in FIG. 16 is only one possible way to output information generated by the process 200 and that others are possible in accordance with other exemplary embodiments.

Figure 14:
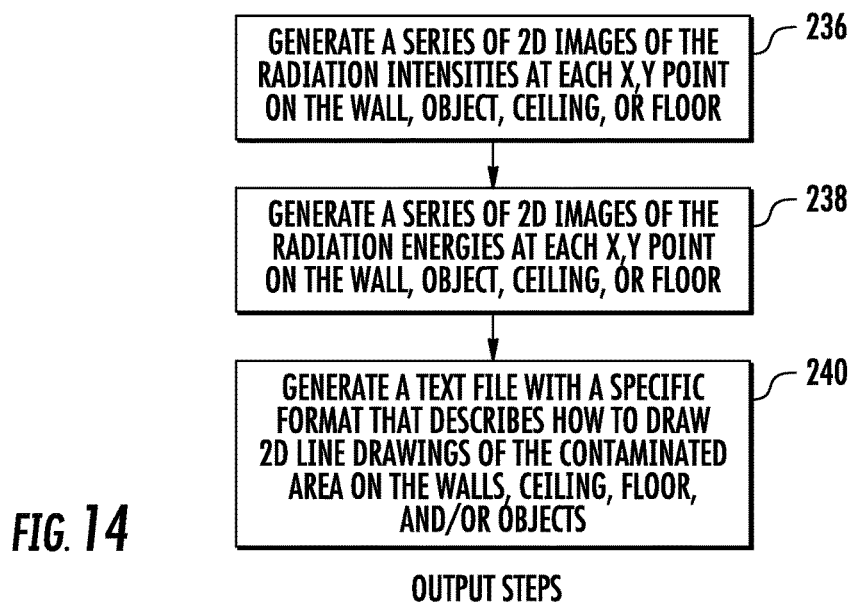
FIG. 14 is a series of output steps for outputting information in the method noted in FIG. 12.

The method 200 may execute such that the only human interaction required is the input data as the processing steps in FIG. 13 and the output steps in FIG. 14 may be performed automatically by a CPU. Further, some of this input data may be automated as well. In addition, much of the input data will remain constant for each characterization, specifically the data on the characterizer device 100. The algorithm removes a human element from the in-depth processing, which reduces error and eliminates the "human opinion" that will vary from one analyst to another, providing consistent and reproducible results.

Figure 17:
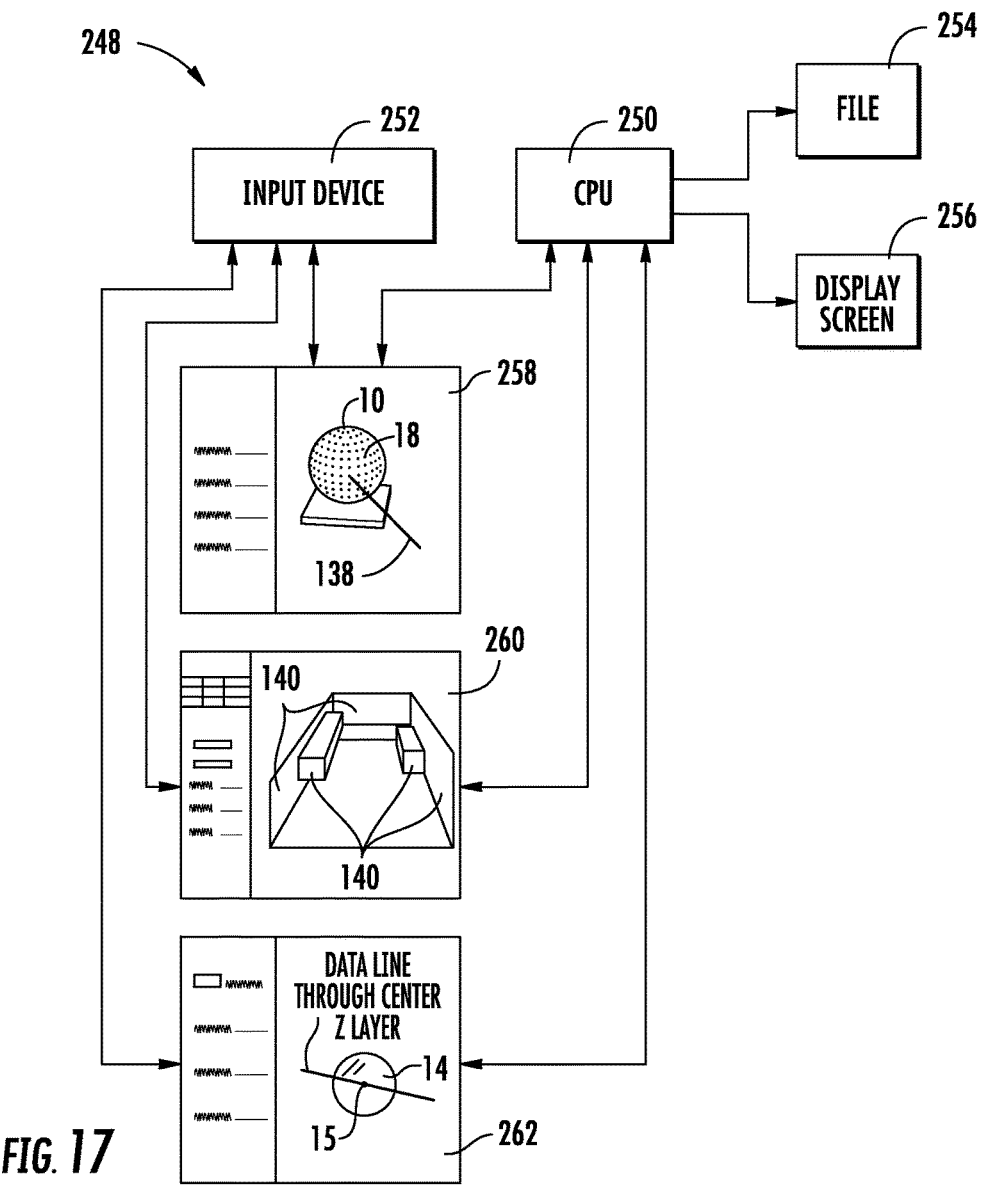
FIG. 17 is a schematic drawing of an apparatus for executing a back-projected radiation analyzer and cell evaluator method in accordance with one exemplary embodiment.

An apparatus 248 capable of implementing and performing the method 200 is disclosed in FIG. 17. The apparatus 248 may include a CPU 250 that can be a processor of a computer and may include random access memory, data storage, and other hardware and software components. The apparatus 248 may also include an input device 252 that may be a computer mouse, keyboard, disk drive, Internet connection, hard-wired connection, wireless connection, and/or computer screen. The CPU 250 may execute a collimator editor module 258 that can be manipulated by the user through use of the input device 252. The collimator editor module 258 may simplify the entry of collimator shield 12 thickness and aperture 18 data. A user-friendly 3D display of the data may be presented to the user to give visual confirmation that the collimator 10 is designed correctly for accurate processing by the method 200. The user may enter other information relevant to the collimator 10 such as the fields of view 22, collimator 10 dimensions, direction of orientation line 138, material making up the detector 14, shape of the detector 14, and/or directional shield 16 data. The various data may be automatically transferred to the apparatus 248 by, for example, the position determination system 100 or by some other automatic input. However, the collimator editor module 158 may allow the user to modify automatically input data, to enter data that has not been automatically provided, or to verify the accuracy of input information.

Another module that may be run by the apparatus 248 is a cell editor module 260 that can be run by the CPU 250 and that can be modified by the input device 252. The cell editor module 260 allows the user to specify contaminated room dimensions as well as adding large objects 140 such as tables, drums and containers. A 3D display may be presented to the user to allow him or her to verify the contaminated room input information.

The CPU 250 and input device 252 may also be used to run and manipulate a detector projection module 262. This module 262 may allow the user to locate the center 15 of the detector 14 in a raw scan file by looking at slices of the detector 14 from the top and sides. The module 262 may present the user with a screen in which he or she can rotate a data line through the center Z layer of the scan file to help determine the radius of the detector 14 in the raw scan. The module 262 may allow him or her to define the track shape and amplitude that can be used to determine the source activity and roughly source energy.

The input steps disclosed in FIG. 12 may be performed by the user through use of the input device 252 and CPU 250, or through just the input device 252, or may be performed through an automatic transfer. The processing steps disclosed in FIG. 13 may be performed automatically by the CPU 250. The output steps disclosed in FIG. 14 may be implemented by being displayed on a display screen 256 and/or by being written to a file 254 or by being transferred in a variety of manners.

The collimator 10 with direction shields 16, the position determination system 100, and the back-projected radiation analyzer and cell evaluator method 200 are capable of mapping radiation intensity onto objects 140 such as tables, cabinets, walls, floors, and ceilings of the scanned area in 3-D computer rendered models. A visual illustration system 300 allows a user to view the detected radiation in real time in the actual, physical room from which the radiation measurements were taken. Such a system 300 provides a mapping of the radiation onto the objects 140 so that the user has knowledge of the actual locations of contamination and in certain arrangements knowledge of the intensity of such radiation. The user may focus his or her decontamination efforts on these areas while the system 300 identifies such areas, or the user may mark them for subsequent decontamination without presence or running of the system 300. The system 300 makes radiation visible, which otherwise would remain invisible.

Figure 18:
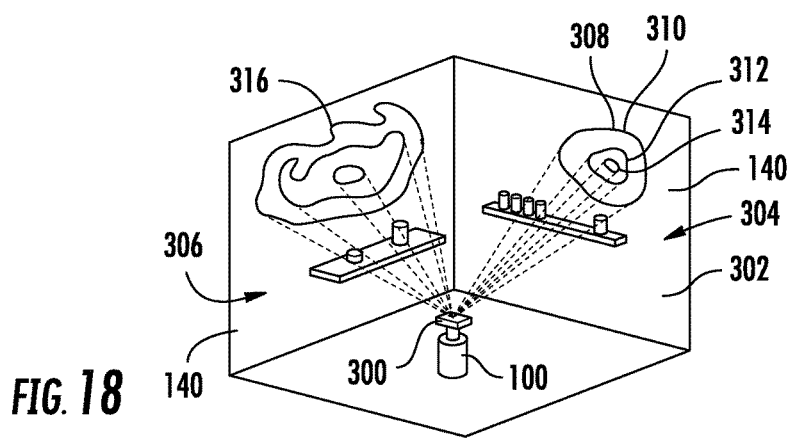
FIG. 18 is a perspective view of a visual illustration system disposed within a contaminated room in accordance with one exemplary embodiment.

With reference first to FIG. 18, the visual illustration system 300 is shown located inside of a contaminated room 302, which may be an actual physical room into which radioactive contamination is present. The visual illustration system 300 creates a projected image 308 onto object 140 which is a wall 304. The visual illustration system 300 may obtain output data from the method 200 and may include a laser projection system that uses same to draw an outline around the contaminated areas of the wall 304. The projected image 308 may include an outermost line that is a low radiation intensity boundary 310. Areas of the wall 304 between the boundary 310 and a medium radiation intensity boundary 312 may be contaminated with low intensity levels of radiation. These visual markers cue the user as to where the low intensity levels of radiation are in the contaminated room 302 so that they can decontaminate same. Additionally or alternatively, the user can mark this area of low intensity radiation level on wall 304 so that it can be decontaminated at a later date.

As disclosed, the visual illustration system 300 is used to identify the location, and possibly additionally the intensity, of radioactive material on the walls 304 of the room. However, it is to be understood that this use of the visual illustration system 300 is only exemplary and that it need not be used to display the location of radioactive material location, and possibly intensity. The visual illustration system 300 may be used in order to visually identify any type of 2D or 3D sensor data obtained. It is therefore the case that the visual illustration system 300 may visually indicate the location of items other than radioactive material. The use of the visual illustration system 300 with radioactive material location identification is only for sake of example and convenience.

As stated, the projected image 308 includes a medium radiation intensity boundary 312 that is surrounded by boundary 310. The area of the wall 304 bounded by the boundary 312 and a high radiation intensity boundary 314 is contaminated with radioactive materials with a medium radiation intensity level. The high radiation intensity boundary 314 completely encloses a perimeter of the wall 304 that is contaminated with high intensity radiation levels. Although shown as having the high radiation intensity boundary 314 completely contained within the perimeter of the medium radiation intensity boundary 312, which is likewise completely contained within the perimeter of the low radiation intensity boundary 310, this is only exemplary and may be varied in other embodiments. For example, the high radiation intensity boundary 314 may surround one or both of the low or medium radiation intensity boundaries 310 and/or 312. The areas between the boundary lines 310, 312 and 314 may not contain laser light such that they are blank or otherwise not filled in with laser light. These areas may simply be devoid of any of the laser light such that only the outlines of the boundary lines 310, 312 and 314 make up the projected image 308. The user can use the boundaries 310, 312, and 314 to identify low, medium, and high intensity radiation levels on the wall 304 so that these can be decontaminated. Additionally or alternatively, the user may mark the location of the radiation by physically marking one or more of the boundaries 310, 312, and/or 314 on the wall 304 so that this radiation can be later decontaminated. The system 300 may function to project the boundaries 310, 312 and 314 as lines so that the areas between these lines 310, 312 and 314 are not otherwise filled in with any light or projections from the system 300. The boundary lines 310, 312 and 314 may all be of the same color, or may be all different colors in accordance with various embodiments. When made of different colors, the user may be more easily able to distinguish between the low, medium and high levels of radiation. The system 300 can create a second projected image 316 onto a second object 140 that may be a second wall 306 contacting and oriented at a 90° angle to the first wall 304. The second projected image 316 may include low, medium, and high radiation intensity boundaries as previously discussed with respect to the first projected image 308 and a repeat of this information is not necessary. The second projected image 308 may indicate the presence of radiation on the second wall 306 and the intensity and shape of the contaminated area, and hence projected image 316, may be different than that of the first projected image 308 since radiation on the two walls 304 and 306 may be located thereon in different amounts, areas, and shapes. The system 300 may utilize the output from steps 236, 238 and/or 240 from the method 200 in addition to orientation and/or location output from the position determination system 100. The system 300 may generate the projected images 308 and 316 via lasers in order to create the outlines around contaminated areas in the contaminated room 302 to give a visual aid to workers as they mark and/or decontaminate the contaminated areas. The system 300 may make the decontamination process more efficient and may reduce radiation exposure to workers.

Figure 19:
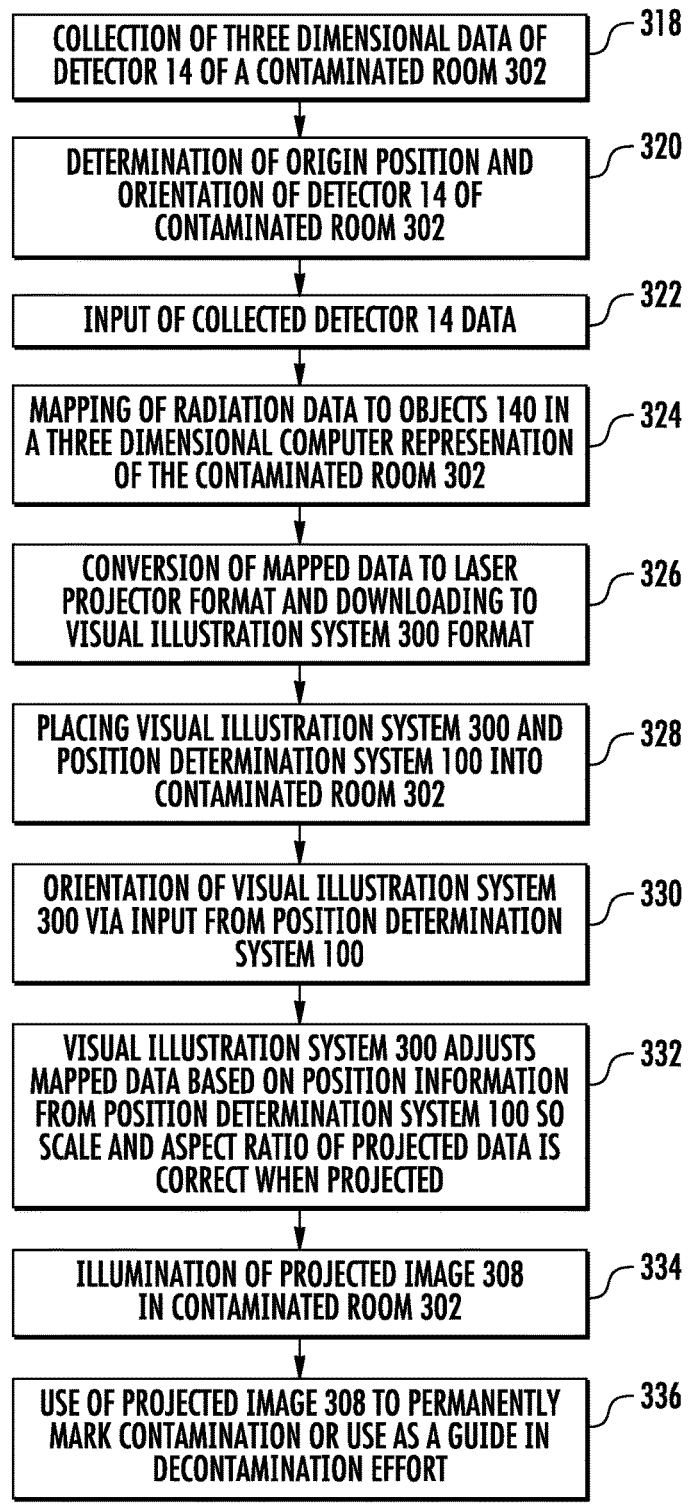
FIG. 19 is a series of method steps for identifying the location of radiation on an object in a contaminated room in accordance with another exemplary embodiment.

An exemplary embodiment of a method of identifying radiation in accordance with one exemplary embodiment is illustrated with reference to FIG. 19. The method may first start at step 318 in which a detector 14 may be deployed into a contaminated room 302 in order to collect radiation data. Moving to step 320, an origin position and the orientation of the detector 14 in the contaminated room 302 may be determined. The origin position may be a center 15 of the detector 14, or can be any other location or point from which the relative positioning of the detector 14 may be determined. The origin position and orientation of the detector 14 can be obtained through a position determination system 100. Next, the data from the detector 14 may be read in step 322. Obtaining data from detector 14 may be accomplished via a telecentric light source 202, aquarium and rotation stage 204, and telecentric lens 206 arrangement as illustrated in FIG. 11. However, it is to be understood that other methods of obtaining data from the detector 14 can be employed in step 322.

The method may then move on to step 324 in which radiation data is mapped to objects 140 in a three dimensional computer rendering of the contaminated room 302. This mapping may be done using input information obtained in steps 318, 320 and 322 and may potentially include information from detector 14, the position determination system 100, and the back-projected radiation analyzer and cell evaluator method 200. The radiation mapping may be to objects 140 such as walls, a ceiling, a floor, a table, a shelf, or another component of the room.

The method may then convert the mapped data of step 324 into a format capable of being read by a laser projector as disclosed in step 326. Here, the back-projected radiation analyzer and cell evaluator method 200 may be used to generate a text file with a specific format capable of describing how to draw two dimensional line drawings of the contaminated area. Such a step is disclosed with reference to step 240 of FIG. 14 in which output from the method 200 is produced. Any of the output in FIG. 14 may be provided to the method in FIG. 19. The data converted into the desired format may then be downloaded to the visual illustration system 300. The software implementing step 326 may cause the image that is to be displayed to be an "outline image" in that the boundary lines 310, 312, and 314 will be displayed and created by laser light while the areas between these lines 310, 312 and 314 will not be filled in by laser light and thus otherwise devoid of light.

Moving next to step 328, the visual illustration system 300 along with the position determination system 100 may be physically placed within the contaminated room 302. This arrangement is shown with reference to FIG. 18. The visual illustration system 300 is located on top of the position determination system 100, but could be located on any portion of the position determination system 100 or could be completely separate from the position determination system 100. Further, it is to be understood that in other embodiments the position determination system 100 need not be present in step 328 and that the visual illustration system 300 can be placed into the contaminated room 302 by itself.

In step 330 the visual illustration system 300 may be oriented by way of input obtained from the position orientation system 100. In this regard, the position orientation system 100 may itself physically orient system 300, or system 300 may itself be capable of physically orienting itself. The system 300 could be oriented so that it is placed into the same physical orientation as the orientation line 138. The system 300 may obtain orientation data from the system 100 so that system 300 knows where the detector 14 is positioned and/or orientated so that the system 300 properly displays the projected image 308. Physical parts of the system 300 may be moved so that the system 300 is properly oriented via input obtained from the position orientation system 100.

The system 300 may be placed at the same height as the origin or other feature of the system 100. In this regard, an origin point on the system 300 may be placed at the same height, or known offset from, a height of the system 100 as both are/were placed in the contaminated room 302. However, if the system 300 is not placed at the same height as the system 100, a distance sensor may be added to the system 100 to determine its height placement. In this regard, this information may be provided to the system 300 so that a user knows where to properly orient the height of the system 300.

Alternatively, the system 300 may have mechanisms capable of adjusting its height, and its height may be set based upon this input data from system 100.

The method may then execute step 332 in which the visual illustration system 300 adjusts the mapped data based upon position information provided by the position orientation system 100. This adjustment may be made so that scale and aspect ratio of the projected image 308 are correct when projected. The projected image 308 can be cast upon an object 140 such as a wall 304 in the contaminated room 302 in step 334. In step 336, the projected image 308 may be used to permanently mark contamination by the user. Additionally or alternatively, the projected image 308 may be used as a guide in the decontamination of the contaminated room 302.

The visual illustration system 300 can be used to display two dimensional data onto walls, floors, ceilings, or other objects for location marking or removal. It is to be understood that radiation need only be one reason why the visual illustration system 300 can be employed, and that other reasons besides radiation source marking or decontamination may result in use of the visual illustration system 300. As such, the visual illustration system 300 can be used for other purposes besides radiation.

Figure 20:
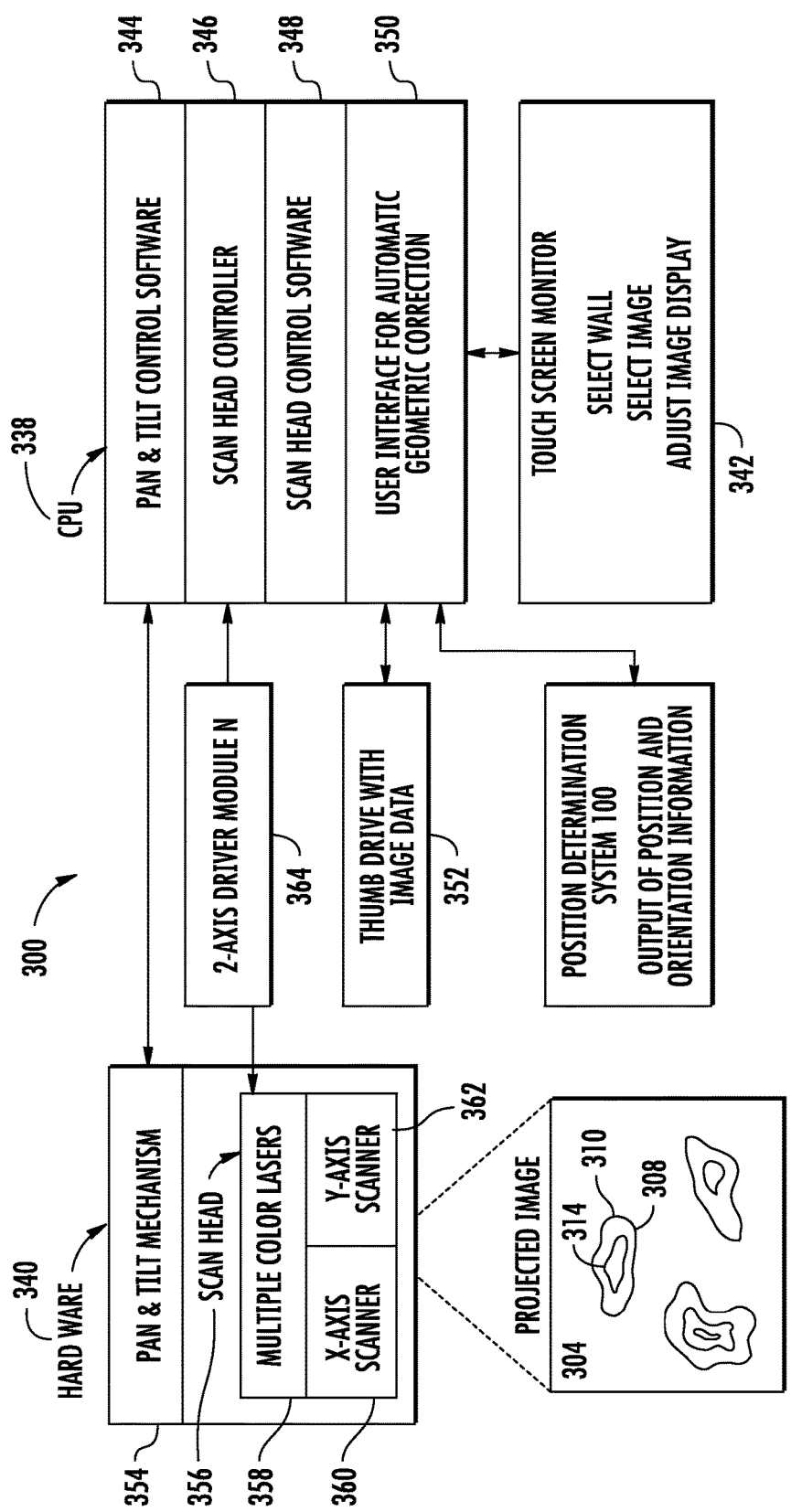
FIG. 20 is a schematic view of a visual illustration system in accordance with another exemplary embodiment.

One exemplary embodiment of the visual illustration system 300 is shown with reference to FIG. 20. The visual illustration system 300 is a customized laser projection system. The position determination system 100 may provide output of position and orientation information to a CPU 338. The position determination system 100 may be physically connected to the CPU 338 through a wired connection, or through a wireless connection, or the data may be input to the CPU 338 by way of a thumb drive 352 or other mechanism. The output from the position determination system 100 may be magnetic heading, pitch and roll of the orientation line 138, and distance from an origin to objects 140 of the contaminated room 302. The output from the position determination system 100 may also be the dimensions of the contaminated room 302 and any other objects 140 present therein such that the three dimensional model of the contaminated room 302 is provided to the CPU 338. The CPU 338 may use all of this information to properly scale and distort the "outline image" or projected images 308 that are to be displayed so that they maintain the correct scale and aspect ratio when projected onto the wall 304 via the hardware 340. The CPU 338 may include random access memory and a non-volatile memory and may include pan & tilt control software 344 that functions to provide instructions on moving and pivoting hardware according to input data. The pan & tilt control software 344 may allow the hardware 340 to properly orient itself via a pan and tilt feature such that these components implement step 330 of FIG. 18.

The CPU 338 may also include a scan head control module 346 that functions to cause a laser scan head to actuate and display a projected image 308. The scan head control module 346 may be provided with instructions via scan head control software 348 that is also included in the CPU 338. The CPU 338 may further include a user interface module 350 that allows the user to make geometric corrections to the projected image 308. Such a module 350 may be helpful if the projected image 308 is not properly sized or fitted to the object 140 in question. The CPU 338 may include a processor that performs computing functions, a volatile memory for the temporary storage of information, a non-volatile memory for the permanent or long term storage of information, and other components commonly found in a standard desk top computer.

The CPU 338 may include a Pangolin QM2000 PCI card, LD2000 software, and custom software and may receive the predefined point structures saved in a text file format. This structure may be converted when the system 300 is offline into a laser displayable format.

A touch screen monitor 342 may be present and can be in communication with the CPU 338. The touch screen monitor 342 may allow the user to input certain commands that cause the CPU 338 to subsequently perform various functions for the visual illustration system 300. For example, the touch screen monitor 342 may allow the user to select a particular wall 140 of the contaminated room 302 for display of the projected image 308. If the user selects, for example, a "north wall" then the visual illustration system 300 will function to turn on all projected images 308 of the north wall while the other walls and objects of the contaminated room 302 are not provided with their projected images. This feature may be necessary when the visual illustration system 300 is only capable of pointing and displaying projected images 308 to one wall at a time. However, in other embodiments, the visual illustration system 300 can be so configured that it may display every projected image 308 in the contaminated room 302. The touch screen monitor 342 allows the user to control which projected images 308 are displayed onto the appropriate wall 140 or object 140. The touch screen monitor 342 may have soft keys that are left and right arrow buttons that will allow one to sequence through images such as north wall, east wall, south wall, west wall, ceiling, floor, and off. Further, if more than one projected image 308 is illuminated on a particular object 140, the touch screen monitor 342 may allow the user to turn certain ones on or off so that only a single projected image 308 is displayed on the object at a particular time.

Aside from selecting a wall 140 or a projected image 308 for display, the touch screen monitor 342 may allow the user to tweak the projected image 308 if it is not exactly correct. For example, the touch screen monitor 342 may allow the user to adjust the projected image 308 via actuation of soft keys including rotate clockwise, rotate counter clockwise, pitch up, pitch down, roll right, roll left, zoom in, and zoom out.

A thumb drive 352 may be included in the visual illustration system 300 that could include image data. The image data may be output from the back-projected radiation analyzer and cell evaluator method 200. The thumb drive 352 may include the processed information from the detector 14 or from the position determination system 100. In other arrangements, information input into the CPU 338 may not come from the thumb drive 352, but may instead come from a wireless or hard wired link from the method 200 or position determination system 100, or may be actually typed or otherwise manually input into the CPU 338.

The visual illustration system 300 may include hardware 340 that is in communication with the CPU 338. One piece of the hardware 340 may be a pan & tilt mechanism 354 that receives commands from the pan & tilt control software 344. The pan & tilt mechanism 354 functions to move other hardware in the vertical and/or horizontal directions and may function to tilt other hardware up and down in a vertical direction or left and right in a horizontal direction. Information from the position determination system 100 may be used by the pan & tilt control software 344 to cause the pan & tilt mechanism 354 to properly orient itself in a pan and tilt manner. Again, this information may be magnetic heading, pitch and roll information, but may be other information in other embodiments. The CPU 338 may be located outside of the contaminated room 302 such that the CPU 338 communicates with the hardware 340 through a wireless communication. Alternatively, the CPU 338 may be located in the contaminated room 302 and communicate with the hardware 340 through a physical, hard wired connection.

The hardware 340 may also include a scan head 356. The scan head 356 can include one or more lasers 358. The lasers 358 may be multiple color lasers so that the projected image 308 may have multiple colors therein. The multiple color lasers 358 may be a red laser and a green laser in accordance with one exemplary embodiment. Various exemplary embodiments exist in which from 1-5, from 5-10, or up to 20 different colored lasers 358 are present in the scan head 356. The scan head 356 may also include an X-axis scanner 360 and a Y-axis scanner 362. The X-axis scanner 360 may be a Cambridge scanner, and the Y-axis scanner 362 may be a Cambridge scanner in one embodiment. The X-axis scanner 360 may be responsible for locating the laser light at the correct location in the X direction, and the Y-axis scanner 362 may be responsible for locating the laser light at the proper location in the Y direction. The scan head 356 is controlled by a 2 axis driver module 364. The 2-axis driver module 364 provides instructions to the X and Y-axis scanners 360 and 362 in order to instruct them where to direct the laser light. The 2-axis driver module 364 may also function to cause the scan head 356 to actuate the proper laser of the multiple color lasers 358 so that the projected image 308 is properly displayed. Although shown as being separate from the CPU 338, the 2-axis driver module 364 may be a part of the CPU 338 in accordance with other exemplary embodiments. The 2-axis driver module 364 may be located in the contaminated room 302 when the projected image 308 is displayed, or may be outside of the contaminated room 302 such that it wirelessly communicates with the hardware 340.

The projected image 308 displayed by the scan head 356 may be a two-dimensional, multiple-color line drawing displayed on one surface 140 at a time. The projected image 308 may be scaled by the scan head 356 and may maintain a proper aspect ratio. The projected image 308 may be scaled and the aspect ratio of the projected image 308 may be maintained such that if the projected image 308 were a rectangle with the same aspect ratio as a wall 140, the laser light would only show at the edges of the wall 140. Portions of the visual illustration system 300, such as the hardware 340, may be placed anywhere on the floor of the contaminated room 302. However, these portions may need to be placed some nominal distance from all of the walls 140 so that the laser light is able to properly display the projected images 308. The visual illustration system 300 will thus function so that if the projected image 308 is a circle, the projected image 308 will look like a circle instead of an ellipse no matter where in the contaminated room 302 the visual illustration system 300 is located. Additionally, the diameter of the projected circle will be the same if the visual illustration system 300 were located close to the wall 140 to which is was projected or if it were located further from the wall 140 to which the projected circle was projected. The visual illustration system 300 may be powered by the use of batteries or may be powered through a standard plug-in connection.

The hardware 340 may include a 110VAC compact PCI computer with a Pangolin QM scan computer on board with 16-bit DACs. A separate driver module 364 may include a power supply and will feed its 2-axis output to a compact XY scanhead by way of an approximately three meter long umbilical. The scan head 356 may have an angular display limited to the capacity of the scanners which may be +/−30 degrees optical. Class 3a green and red lasers may be used with digital color control and blanking signals provided by the QM board via the 2 axis driver module 364. The system 300 hardware 340 may be configured so that both lasers cannot be on at the same time. The laser output may be a combined 50 mw with digital color control and blanking signals provided by the QM board with the 2 axis driver module 364. The laser output may be automatically shut off via the CPU 338 software or software of the scan head 356 or 2 axis driver module 364 if there is a scan head failure or if the scan speed falls below a safe threshold.

The software of the CPU 338 may be Windows based with a Pangolin LD2000 scan engine. Wizard 2000 software will have the capability of converting text files in proprietary format into generic Pangolin laser viewable 1 db format. The text file may contain a sequential specification of Cartesian coordinates and the required display color of those coordinates including black for blanking point. The text file may include a header that specifies the total points contained in the image array.

The CPU 338 may be arranged so that the scan head control 346 and the scan head control software 348 is Pangolin QM2000 hardware, Pangolin LD2000 software, and Holo-Spectra Wizard 2000 software in accordance with one exemplary embodiment. Further, although disclosed as having a pan & tilt mechanism 354 and pan & tilt control software 344, these elements are not needed in certain exemplary embodiments.

The visual illustration system 300 need not be positioned in the same point in the room as the position determination system 100, center 15 of detector 14, or origin used by the position determination system 100. Further, the visual illustration system 300 need not be oriented the same way as the orientation line 138. The visual illustration system 300 obtains data on the configuration of the contaminated room 302 and the location of contamination in the contaminated room 302. Knowledge of the dimensions of the contaminated room 302 and the location and intensity of contamination allows for this feature. In this regard, so long as the visual illustration system 300 knows where it is located, it may project the projected images 308 properly. However, it may be the case that the visual illustration system 300 is placed onto the position determination system 100 or otherwise incorporated therewith. The visual illustration system 300 may piggyback onto the position orientation and determination features of system 100 and thus a repeat of these hardware and software features need not be added. As such, the visual illustration system 300 may obtain output from system 100 so that the system 300 knows its position and orientation within the contaminated room 302.

The visual illustration system 300 may be wrapped in plastic so that it can be retrieved and reused later considering the fact that the room into which it is placed will be contaminated with radioactive material. Alternatively, the system 300 can be made inexpensively enough so that it can be simply disposed of if it becomes contaminated with radioactive material.

Figure 21:
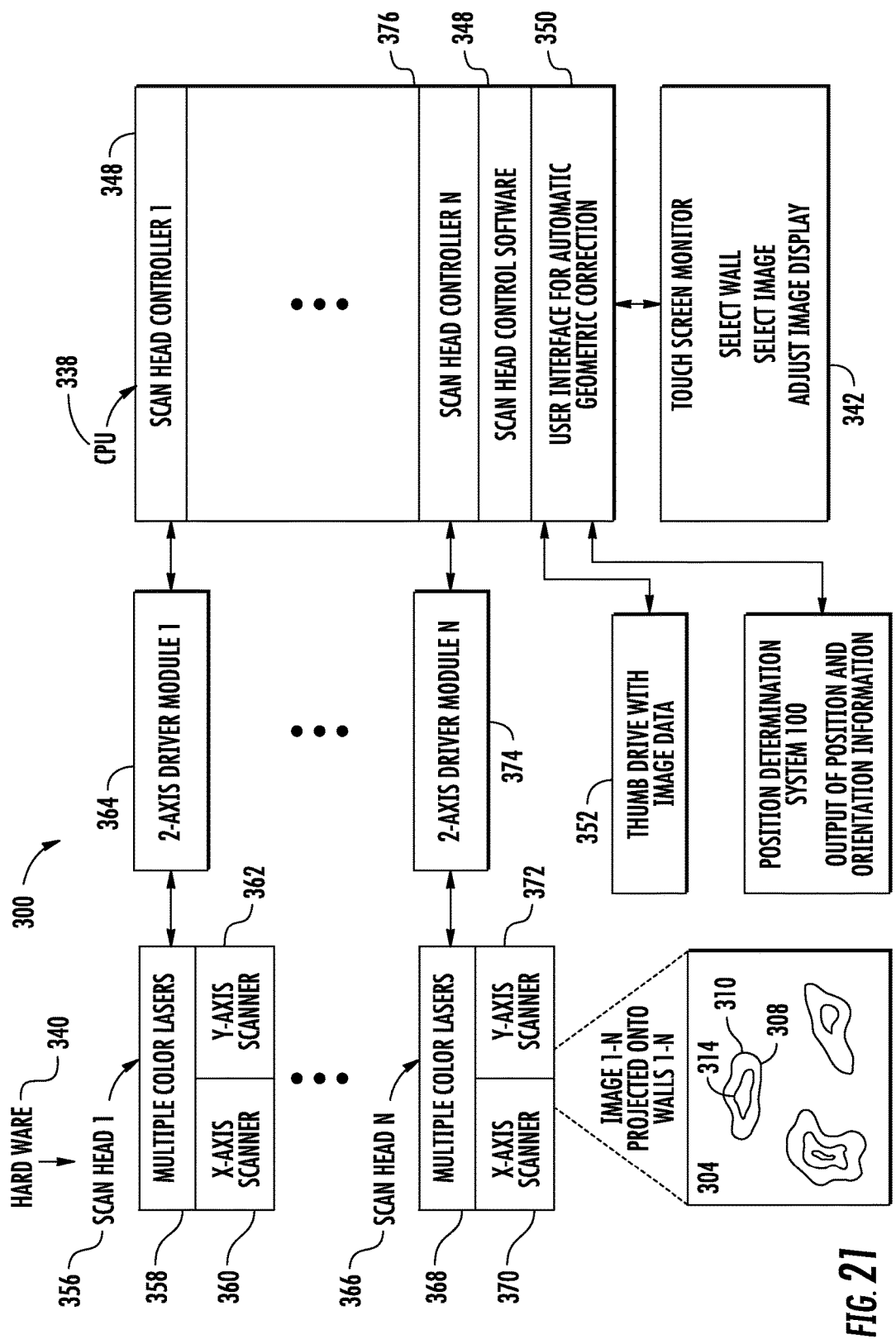
FIG. 21 is a schematic view of a visual illustration system in accordance with a yet additional exemplary embodiment.

An alternative exemplary embodiment of the system 300 is shown with reference to FIG. 21. Here, instead of employing the pan & tilt mechanism 354 and associated software 344, the system employs a plurality of scan heads 356 to obtain the desired projected image 308. The various scan heads 356 may be positioned so that they are at angles sufficient to provide coverage to the object 140 or objects 140 of the contaminated room 302. The system 300 may be capable of rotating the various scan heads 356 or raising or lowering same so that they may have some degree of movement. However, the various scan heads 356 need not be capable of being pivoted or moved in accordance with various exemplary embodiments.

The hardware 340 includes a plurality of scan heads. As shown, a first scan head 356 is disclosed, along with an N number of scan heads 366. Any number N of scan heads 366 can be present. For example, from 1-5, from 6-10, or up to 100 additional scan heads 366 can be included. Each one of the scan heads 366 may include an X-axis scanner 370 and a Y-axis scanner 372. Further, each one of the additional scan heads 366 may include multiple color lasers 368 that may be of the same number and colors as multiple color lasers 358. The additional scan heads 366, lasers 368, and X and Y-axis scanners 370 and 372 may be configured as those previously discussed with respect to the scan head 356, lasers 358, and X and Y-axis scanners 360 and 362 and a repeat of this information is not necessary. An additional 2-axis driver module 374 may be provided with each one of the additional scan heads 366 to direct functioning of the scan heads 366 in a manner similar to that of module 364. As such, a repeat of this information is not necessary. Each additional scan head N 366 may be provided with its own dedicated 2-axis driver module N 374.

The system 300 in FIG. 21 does not include a pan & tilt mechanism 354 and pan & tilt control software 344. However, the CPU 338 is provided with additional scan head controllers N 376 that function to send instructions to their respective 2-axis driver module 374. Each one of the additional 2-axis driver modules 374 may have its own dedicated additional scan head controller N 376 in the CPU 338. The scan head controller N 376 can be configured in a manner previously discussed with respect to the scan head controller 348, and a repeat of this information is not necessary. The remaining features of system 300 in FIG. 21 may be arranged as those in FIG. 20 and a repeat of this information is not needed. The multiple scan heads 366 can be simultaneously actuated, if appropriate, in order to generate the projected image 316. As such, any number of scan heads 366 can be actuated at a single time to generate image 316. The scan heads 366 may provide coverage to different angles of the object 140 so that the scan heads 366 need not be pivoted or panned in order to accurately create the projected image 316.

As used herein, the various rooms or contaminated rooms 302 disclosed with reference to the various methods, systems and apparatuses discussed can be reactors, fuel and isotope processing facilities, laboratories, hot cells, glove boxes, or isolators. The various rooms or contaminated rooms 302 can be any room or even an outside area onto which radiation contamination may be present.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A position determination system, comprising:
   a base;
   a radiosensitive detector carried by the base;
   a distance sensor carried by the base and capable of sensing a distance to an object, wherein the distance sensor is capable of being rotated 360° with respect to the base and the radiosensitive detector; and
   a CPU that receives information from the distance sensor to determine a distance to the object.

2. The position determination system as set forth in claim 1, wherein the object is a wall of a room, and wherein the radiosensitive detector does not rotate with respect to the base, and wherein the CPU is carried by the base.

3. The position determination system as set forth in claim 1, wherein the CPU determines a perpendicular distance to the object and determines an angular position of the object.

4. The position determination system as set forth in claim 1, wherein the distance to the object is determined from an origin that is selected from the group consisting of a center of the radiosensitive detector, a face of the distance sensor, a center of the base, or a center of a rotational axis of the distance sensor.

5. A position determination system, comprising:
   a radiosensitive detector;
   a distance sensor operably coupled to the radiosensitive detector;
   a motor coupled to the distance sensor to rotate the distance sensor to 360° around the radiosensitive detector; and
   a CPU that controls the operation of the motor to move the distance sensor around the radiosensitive detector and determines distance and angle data from the distance sensor to an object.

6. The position determination system as in claim 5, wherein the CPU determines an orientation of the radiosensitive detector.

7. The position determination system as in claim 5, wherein the CPU determines a perpendicular distance from the radiosensitive detector to the object.

8. The position determination system as in claim 5, further comprising a rotatable connection between the radiosensitive detector and the distance sensor.

9. A method for determining a position of a radiosensitive detector, comprising:
   rotating a distance sensor to 360° around the radiosensitive detector; and
   measuring distance and angle data from the distance sensor to an object at incremental positions around the radiosensitive detector.

10. The method as in claim 9, further comprising determining an Orientation of the radiosensitive detector.

11. The method as in claim 9, further comprising determining a perpendicular distance from the radiosensitive detector to the object.

12. The method as in claim 9, further comprising determining if the object is on a wall segment.

13. The method as in claim 12, further comprising determining a perpendicular distance to the wall segment.

* * * * *